United States Patent
Koue

(10) Patent No.: US 11,178,553 B2
(45) Date of Patent: Nov. 16, 2021

(54) INFORMATION PROCESSING APPARATUS AND NON-TRANSITORY COMPUTER READABLE STORAGE MEDIUM

(71) Applicant: FUJIFILM BUSINESS INNOVATION CORP., Tokyo (JP)

(72) Inventor: Toshiaki Koue, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 200 days.

(21) Appl. No.: 15/952,685

(22) Filed: Apr. 13, 2018

(65) Prior Publication Data
US 2018/0317101 A1 Nov. 1, 2018

(30) Foreign Application Priority Data

Apr. 28, 2017 (JP) .............................. JP2017-089768

(51) Int. Cl.
*H04W 24/02* (2009.01)
*H04W 72/08* (2009.01)
*H04W 72/04* (2009.01)
*H04W 36/30* (2009.01)
*H04W 36/06* (2009.01)

(52) U.S. Cl.
CPC .......... *H04W 24/02* (2013.01); *H04W 36/30* (2013.01); *H04W 72/0453* (2013.01); *H04W 72/085* (2013.01); *H04W 36/06* (2013.01)

(58) Field of Classification Search
CPC ... H04W 24/02; H04W 36/30; H04W 72/085; H04W 72/0453; H04W 36/06
See application file for complete search history.

(56) References Cited

U.S. PATENT DOCUMENTS

| 6,446,132 B1 | 9/2002 | Kikuchi | |
| 2013/0297810 A1* | 11/2013 | Ho | H04W 76/19 |
| | | | 709/228 |
| 2015/0220290 A1* | 8/2015 | Park | H04N 1/00204 |
| | | | 358/1.13 |
| 2015/0327138 A1 | 11/2015 | Lee et al. | |

(Continued)

FOREIGN PATENT DOCUMENTS

| JP | H11-313074 A | 11/1999 |
| JP | 2006-080782 A | 3/2006 |
| JP | 2010-232724 A | 10/2010 |

(Continued)

OTHER PUBLICATIONS

Dec. 8, 2020 Office Action issued in Japanese Patent Application No. 2017-089768.

(Continued)

*Primary Examiner* — Thai Nguyen
(74) *Attorney, Agent, or Firm* — Oliff PLC

(57) ABSTRACT

An information processing apparatus includes a communication unit and a switching unit. The communication unit is configured to conduct a wireless communication using plural transmission methods, one of which has plural channels. When a channel or transmission method having a higher communication quality than that of a communication that is being conducted has become able to communicate, the switching unit switches to the channel or the transmission method having the higher communication quality.

3 Claims, 23 Drawing Sheets

(56) References Cited

U.S. PATENT DOCUMENTS

2016/0218890 A1* 7/2016 Sanderovich ..... H04L 25/03305
2017/0105222 A1* 4/2017 Nieman ................ H04W 8/005

FOREIGN PATENT DOCUMENTS

| JP | 2015-61274 A | 3/2015 |
| JP | 2015-216522 A | 12/2015 |
| WO | 2014/006792 A1 | 1/2014 |

OTHER PUBLICATIONS

Jun. 1, 2021 Office Action issued in Japanese Patent Application No. 2017-089768.

* cited by examiner

FIG.8

| CHANNEL | IN-USE | USED |
|---|---|---|
| 36ch | ○ | |
| 40ch | ○ | |
| 44ch | | |
| 48ch | | ○ |
| 52ch | | ○ |
| 56ch | | |
| 60ch | | |
| 64ch | | |
| 100ch | ○ | |
| 104ch | | |
| 108ch | | |
| 112ch | | ○ |
| 116ch | | ○ |
| 120ch | | ○ |
| 124ch | | |
| 128ch | | |
| 132ch | ○ | |
| 136ch | ○ | |
| 140ch | | |

FIG.10

| TRANSMISSION METHOD | IN-USE | USED |
|---|---|---|
| 802.11b | | ○ |
| 802.11a | ○ | ○ |
| 802.11g | | ○ |
| 802.11n | ○ | |
| 802.11ac | | |
| 802.11ad | ○ | |
| BLUETOOTH | | |

FIG.21

| PRIORITY (2110) | TRANSMISSION METHOD (2120) |
|---|---|
| 1 | 802.11ad |
| 2 | 802.11ac |
| 3 | 802.11n |
| 4 | 802.11g |
| 5 | 802.11b |
| 6 | 802.11a |
| ⋮ | ⋮ |

| PRIORITY (2210) | TRANSMISSION METHOD (2220) | CHANNEL (2230) |
|---|---|---|
| 1 | 802.11ad | 1 |
| 2 | 802.11ad | 3 |
| 3 | 802.11ad | 2 |
| 4 | 802.11ac | 1 |
| ⋮ | ⋮ | ⋮ |

(2200)

INFORMATION PROCESSING APPARATUS AND NON-TRANSITORY COMPUTER READABLE STORAGE MEDIUM

CROSS-REFERENCE TO RELATED APPLICATIONS

This application is based on and claims priority under 35 USC 119 from Japanese Patent Application No. 2017-089768 filed Apr. 28, 2017.

BACKGROUND

Technical Field

The present invention relates to an information processing apparatus and a non-transitory computer readable storage medium.

SUMMARY

According to an aspect of the invention, an information processing apparatus includes a communication unit and a switching unit. The communication unit is configured to conduct a wireless communication using plural transmission methods, one of which has plural channels. When a channel or transmission method having a higher communication quality than that of a communication that is being conducted has become able to communicate, the switching unit switches to the channel or the transmission method having the higher communication quality.

BRIEF DESCRIPTION OF THE DRAWINGS

Exemplary embodiments of the present invention will be described in detail based on the following figures, wherein:

FIG. 8 is an explanatory view illustrating an exemplary data structure of a channel use table;

FIG. 10 is an explanatory view illustrating an exemplary data structure of a transmission method use table;

FIG. 21 is an explanatory view illustrating an exemplary data structure of a priority table;

FIG. 22 is an explanatory view illustrating an exemplary data structure of a priority table;

DETAILED DESCRIPTION

Hereinafter, various exemplary embodiments for implementing the present invention will be described based on the accompanying drawings.

Figure 1:
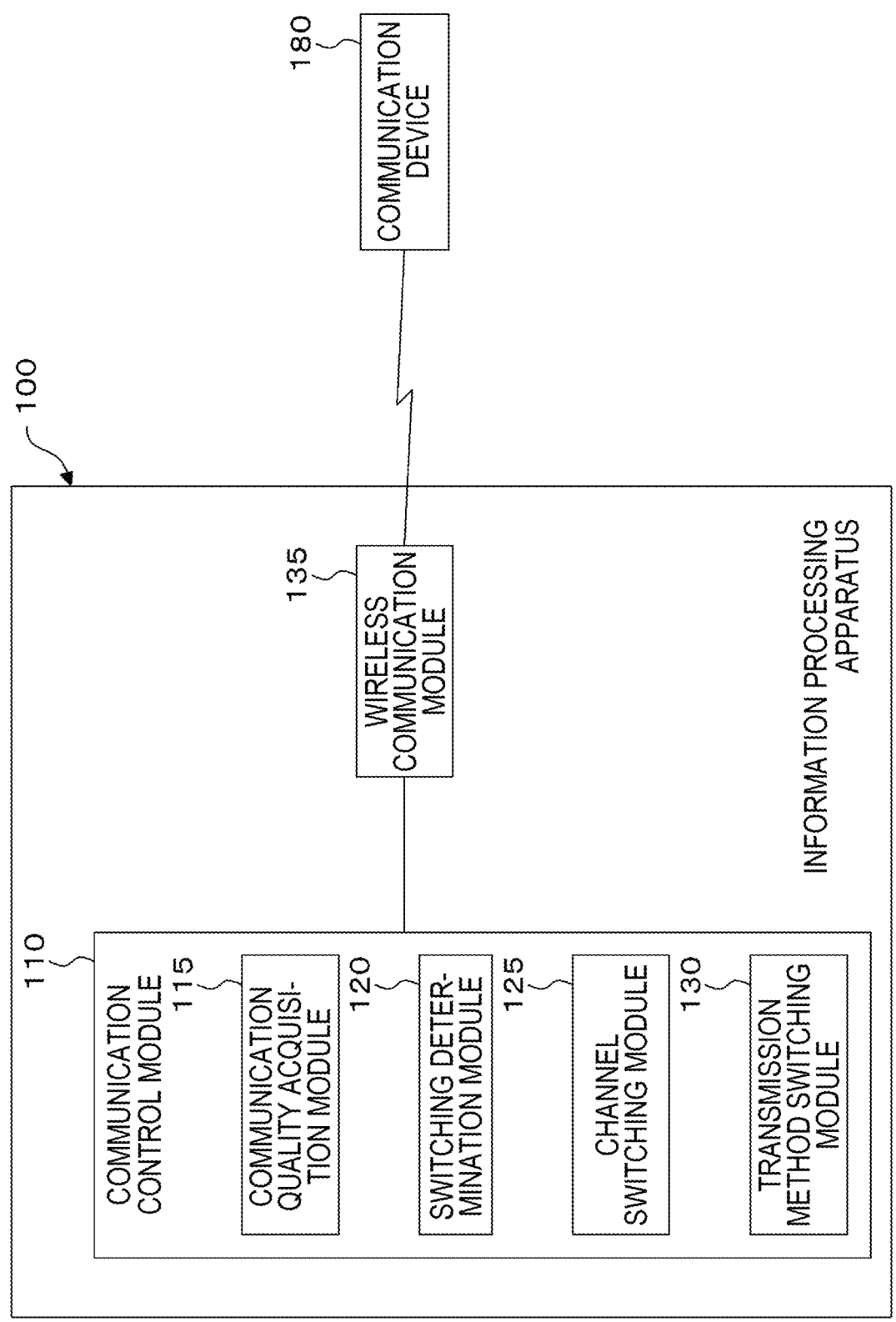
FIG. 1 is a conceptual module configuration diagram illustrating an exemplary configuration of a first exemplary embodiment.

FIG. 1 is a conceptual module configuration diagram illustrating an exemplary configuration of a first exemplary embodiment.

A module, in general, indicates a logically separable component such as software (computer program) or hardware. Accordingly, a module in the present exemplary embodiment indicates not only a module in a computer program but also a module in a hardware configuration. Thus, the descriptions of the present exemplary embodiment also include descriptions of a computer program to serve as a module (a program that causes a computer to execute respective processes, a program that causes a computer to serve as respective units, and a program that causes a computer to implement respective functions), a system, and a method. For convenience of descriptions, the expressions "store," "caused to store," and equivalent expressions thereto will be used. If an exemplary embodiment is directed to a computer program, the expressions indicate storing data or the like in a memory device or performing a control to cause data or the like to be stored in a memory device. In addition, one module may correspond to one function. In implementation, however, one module may be configured with one program, multiple modules may be configured with one program, and in reverse, one module may be configured with multiple programs. Further, multiple modules may be executed by one computer, or one module may be executed by multiple computers in a distributed or parallel environment. In addition, one module may include another module. Hereinafter, the term "connection" is also used for a logical connection (for example, data exchange, instructions, and a reference relationship among data), in addition to a physical connection. The term "predetermined" refers to being determined prior to a target process. The term "predetermined" includes the meaning of being determined according to a circumstance/state at or until a specific time point not only before a process by the present exemplary embodiment is started, but also prior to a target process even after a process by the present exemplary embodiment is started. If multiple "predetermined values" exist, the values may be different from each other, or two or more of the values (or all values, of course) may be identical to each other. In addition, the description "when it is A, B is performed" indicates that "it is determined whether it is A, and if it is determined that it is A, B is performed," except for a case where it is unnecessary to make the determination as to whether it is A. If items are enumerated like "A, B, and C," the enumeration is merely exemplary and includes a case of selecting only one (for example, only A) of the items, unless otherwise specified.

In addition, a system or device includes a system or device which is implemented with one computer, hardware component, device or the like, in addition to a system or device configured such that multiple computers, hardware components, devices and the like are connected to each other by a communication unit such as a network (including a one-to-one corresponding communication connection). The terms "device" and "system" are synonymous with each other. Of course, the "system" does not include a system merely meaning a social "structure" (social system) which is an artificial engagement.

In addition, target information is read from a memory device per process by each module or for each of multiple processes which are executed in a module. After the process is executed, the process result is stored in the memory device. Accordingly, descriptions of reading from the memory device prior to the process and storing in the memory device after the process may be omitted. Examples of the memory device may include a hard disk, a random access memory (RAM), an external memory medium, a memory device through a communication line, a register within a central processing unit (CPU), and the like.

An information processing apparatus 100 of the first exemplary embodiment conducts a wireless communication. The information processing apparatus 100 includes a communication control module 110 and a wireless communication module 135 as illustrated in the example of FIG. 1.

A communication device 180 is connected to the wireless communication module 135 of the information processing apparatus 100 via a communication line. The communication device 180 is capable of conducting a wireless communication and is, for example, a mobile information terminal, a notebook PC, or an access point. There may be provided multiple communication devices 180 that are capable of conducting a wireless communication with the information processing apparatus 100.

The wireless communication module 135 is connected to the communication control module 110 and also connected to the communication device 180 via a communication line. The wireless communication module 135 is capable of conducting a wireless communication using multiple transmission methods. Further, the wireless communication module 135 is capable of conducting a wireless communication with multiple communication devices 180. The multiple transmission methods may include, for example, IEEE802.11a, IEEE802.11b, IEEE802.11c, IEEE802.11g, IEEE802.11n, IEEE802.11ac, IEEE802.11j, IEEE802.11ad, and Bluetooth (registered trademark).

In addition, at least one of the transmission methods of the wireless communication module 135 has multiple channels (wireless communication paths). Of course, each of all the transmission methods may have multiple channels.

The transmission methods by which the wireless communication module 135 is capable of conducting a wireless communication may include at least the communication standard of IEEE802.11ad.

The communication control module 110 includes a communication quality acquisition module 115, a switching determination module 120, a channel switching module 125, and a transmission method switching module 130. The communication control module 110 is connected to the wireless communication module 135. The communication control module 110 controls the wireless communication between the information processing apparatus 100 and the communication device 180.

The communication quality acquisition module 115 acquires the quality of a communication that is being conducted using the wireless communication module 135. Here, the "quality of a communication" (communication quality) includes a transmission quality, a connection quality, and a stability quality. For example, the quality of a communication includes a communication speed (for example, speed, delay, and responsiveness), stability (for example, data loss rate and reliability), a coverage range and others, and specifically corresponds to detecting a communication speed per unit time, a reception level of a radio signal, an occurrence of disconnection of a wireless communication during the communication and others.

The switching determination module 120 determines whether to switch the communication that is being conducted by the wireless communication module 135, based on the communication quality acquired by the communication quality acquisition module 115. The switching is performed when the communication quality is deteriorated. For example, if the wireless communication speed or the reception level of a radio signal acquired by the communication quality acquisition module 115 is lower than a predetermined threshold value, switching by the channel switching module 125 or the transmission method switching module 130 is performed. In addition, if the communication quality acquisition module 115 detects disconnection of a wireless communication during the communication (or if the number of times of the disconnection is larger than a predetermined threshold value or the disconnection time is longer than a predetermined time), the switching by the channel switching module 125 or the transmission method switching module 130 is performed.

The channel switching module 125 switches between the channels according to the quality of the communication that is being conducted by the wireless communication module 135. Here, the description "according to the quality of the communication that is being conducted" corresponds to, for example, a case where the wireless communication speed is slow, the reception level of a radio signal is low, or communication is disconnected during the communication, in the communication device 180 which is a communication counterpart. "Switching between the channels" includes, for example, changing a frequency.

In addition, the channel switching module 125 may switch between channels when the number of times of the switching is less than or equal to or less than a predetermined value.

In addition, the channel switching module 125 may switch to a channel different from an already selected channel.

In addition, the channel switching module 125 may switch to a channel having a frequency band that does not overlap with that of an already selected channel.

The transmission method switching module 130 switches between the transmission methods when the channel switching module 125 could not switch between the channels. "Switching between the transmission methods" includes, for example, switching from IEEE802.11b to IEEE802.11n. In addition, the switching may be a switching from an identical frequency band to another frequency band. For example, the switching may switch from a transmission method of 2.4 GHz to a transmission method of 5 GHz. That is, switching between the transmission methods within the same frequency band may not be performed.

In addition, if the number of times of the switching by the channel switching module 125 is larger than or equal to or larger than a predetermined value, the switching by the transmission method switching module 130 may be performed.

In addition, if the channel switching module 125 could not select a channel different from an already selected channel, the switching by the transmission method switching module 130 may be performed.

In addition, if the channel switching module 125 could not select a channel having a frequency band that does not overlap with an already selected channel, the switching by the transmission method switching module 130 may be performed.

In addition, the transmission method switching module 130 may switch a transmission method to IEEE802.11ad.

Figure 2A:
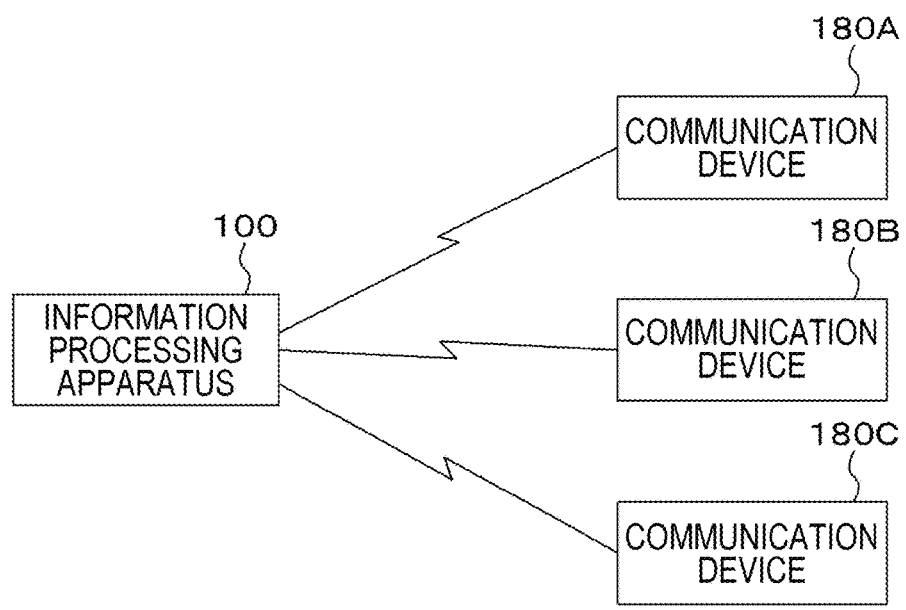
FIGS. 2A and 2B are explanatory views illustrating exemplary system configurations using the exemplary embodiment.
Figure 2B:
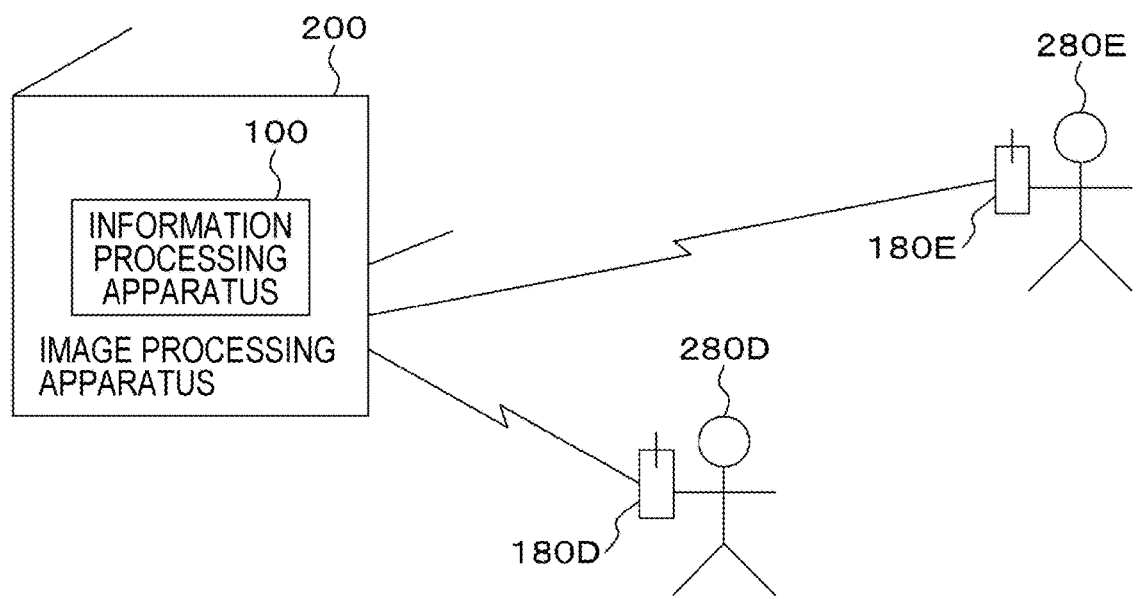

FIGS. 2A and 2B are explanatory views illustrating an exemplary system configuration using the present exemplary embodiment.

As illustrated in the example of FIG. 2A, the information processing apparatus 100 (which may be an information processing apparatus 1100 in FIG. 11 or an information processing apparatus 1600 in FIG. 16) conducts a wireless communication with multiple communication devices 180 (communication devices 180A, 180B, and 180C). The wireless communication is conducted by a transmission method enabling the mutual communication between the information processing apparatus 100 and the communication devices 180. A channel is determined according to a predetermined algorithm at the time of starting the communication.

In the wireless communication, the communication quality may change during the communication. For example, the communication quality may change due to a usage environment, a congestion status, a malfunction, and the like. More specifically, the communication quality may change due to movement of an obstacle for a wireless communication (for example, an automobile, opening/closing of a door, and persons), movement of the information processing apparatus 100 or the communication devices 180 (for example, movement of the owner of the information processing apparatus 100 or the communication devices 180 when the information processing apparatus 100 or the communication devices 180 are mobile devices), use of another device (for example, a microwave oven and other communication devices), and traffics.

In the information processing apparatus 100 of the first exemplary embodiment, if the quality of the communication that is being conducted is deteriorated, switching is performed in an order of a channel and a transmission method, for better communication quality.

In the information processing apparatus 1100 of a second exemplary embodiment, if the quality of the communication that is being conducted is deteriorated, switching is performed in an order of a transmission method and a channel, for better communication quality.

In the information processing apparatus 1600 of a third exemplary embodiment, if a communication having a better communication quality than that of a communication that is being conducted becomes possible, the current communication is switched to a transmission method or channel of the possible communication.

As illustrated in the example of FIG. 2B, an image processing apparatus 200 may have the information processing apparatus 100.

The image processing apparatus 200 is capable of conducting a wireless communication with a communication device 180D of a user 280D and a communication device 180E of a user 280E.

For example, the user 280D transmits a printing instruction to the image processing apparatus 200 by operating the communication device 180D and gets a printed matter from the image processing apparatus 200. In addition, the user 280E transmits a scanned image to the communication device 180E to store the image in the communication device 180E, by performing a scan operation with the image processing apparatus 200.

Figure 3:
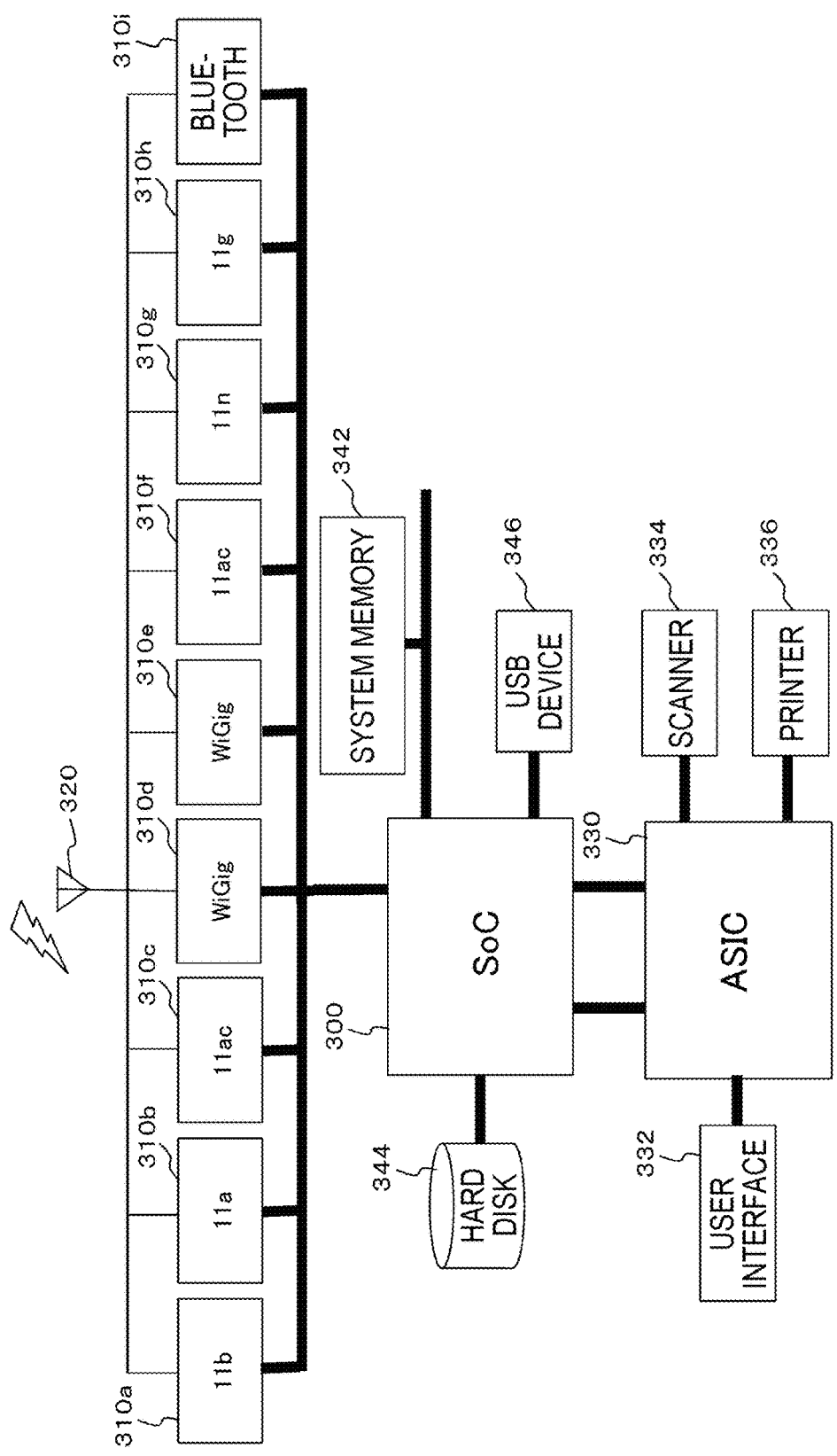
FIG. 3 is an explanatory view illustrating a specific exemplary configuration of the exemplary embodiment.

FIG. 3 is an explanatory view illustrating a specific exemplary configuration of the present exemplary embodiment (the image processing apparatus 200). The image processing apparatus 200 includes a system on a chip (SoC) 300, 11b:310a, 11a:310b, 11ac:310c, WiGig:310d, WiGig:310e, 11ac:310f, 11n:310g, 11g:310h, Bluetooth 310i, an antenna 320, a system memory 342, a hard disk 344, a USB device 346, an application specific integrated circuit (ASIC) 330, a user interface 332, a scanner 334, and a printer 336.

11b:310a is connected to the antenna 320 and the SoC 300. 11a:310b is connected to the antenna 320 and the SoC 300. 11ac:310c is connected to the antenna 320 and the SoC 300. WiGig:310d is connected to the antenna 320 and the SoC 300. WiGig:310e is connected to the antenna 320 and the SoC 300. 11ac:310f is connected to the antenna 320 and the SoC 300. 11n:310g is connected to the antenna 320 and the SoC 300. 11g:310h is connected to the antenna 320 and the SoC 300. Bluetooth 310i is connected to the antenna 320 and the SoC 300. The antenna 320 may be shared. Further, multiple antennas 320 may be provided. The combination of the communication devices (communication chips) 310 and the antenna 320 is an example implementing the wireless communication modules 135 illustrated in the example of FIG. 1. 11b:310a to 11g:310h comply with the "IEEE 802.11 standard" which is the international standard of the wireless communication standard and includes "a," "a/b," "b/g," "a/b/g/n," and the like. Of course, Wireless Fidelity (Wi-Fi) which is a product complying with the above-described standard may be used. Especially, IEEE802.11ad which is a wireless communication standard of the 60 GHz band may be adopted. That is, WiGig (Wireless Gigabit) which is a product complying with IEEE802.11ad may be used. As the transmission method of the wireless communication, transmission methods such as Bluetooth 310i other than the "IEEE802.11 standard" may be used.

The SoC 300 is connected to 11b:310a, 11a:310b, 11ac:310c, WiGig:310d, WiGig:310e, 11ac:310f, 11n:310g, 11g:310h, Bluetooth 310i, the system memory 342, the hard disk 344, the USB device 346, and the ASIC 330. The SoC 300 is an example implementing the communication control module 110. The SoC 300 mainly controls the communication devices (communication chips) 310, the system memory 342, the hard disk 344, and the USB device 346.

The system memory 342 is connected to the SoC 300. The system memory 342 is, for example, a memory used for executing programs of the communication control module 110.

The hard disk 344 is connected to the SoC 300. The hard disk 344 stores, for example, a channel use table 700, a channel use table 800, a transmission method use table 1000, and communication contents.

The USB device 346 is connected to the SoC 300. The USB device 346 reads from and writes into, for example, an external connection device such as a removable storage medium and an IC card. In addition, another communication device may be connected.

The ASIC 330 is connected to the SoC 300, the user interface 332, the scanner 334, and the printer 336. The ASIC 330 controls the scanner 334, the printer 336, the user interface 332 and the like to implement the main functions of the image processing apparatus 200.

The user interface 332 is connected to the ASIC 330. The user interface 332 receives an operation by a user and presents a message or the like to the user by controlling, for example, a liquid crystal display also serving as a touch panel. In addition, the user interface 332 may receive the user's operation (including gaze, gesture, voice, and the like) using a mouse, a keyboard, a camera, a microphone or the like, and may present a message to the user by voice output from a loudspeaker or touch sense using a touching device.

The scanner 334 is connected to the ASIC 330. The scanner 334 reads an image of an original document and transmits the image.

The printer 336 is connected to the ASIC 330. The printer 336 performs printing according to a printing instruction received by the communication devices (communication chips) 310 or the user interface 332.

Figure 4A:
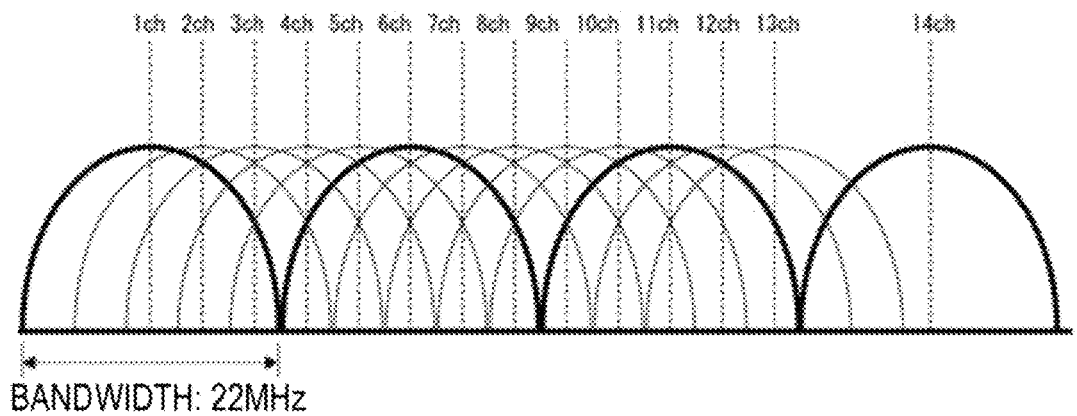
FIGS. 4A and 4B are explanatory views illustrating examples of channels.
Figure 4B:
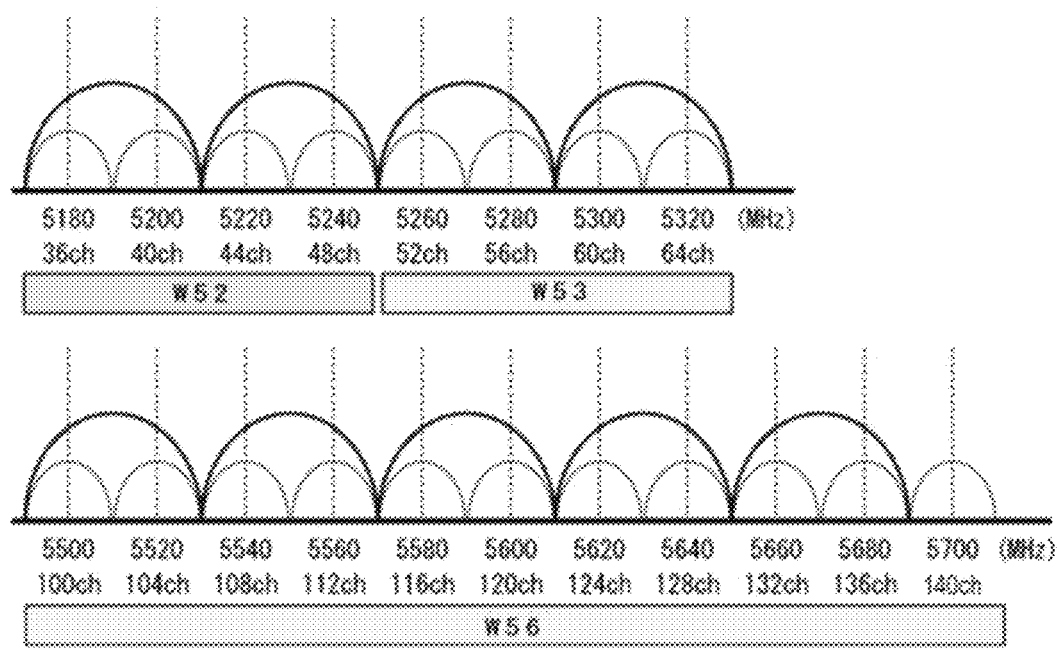

FIGS. 4A and 4B are explanatory diagrams illustrating examples of channels.

For example, descriptions will be made on channels in the "2.4 GHz band" and the "5 GHz band" of the "IEEE 802.11 standard."

The wireless standard using the "2.4 GHz band" is easily affected by other devices and is difficult to conduct a stable communication. For example, if a microwave oven or another identical wireless LAN device exists nearby, the communication often becomes unstable. Meanwhile, compared to the "5 GHz band," radio waves reach far away and are less affected by an obstacle or the like. Further, the "2.4 GHz band" is used by many devices and highly compatible.

Since the "5 GHz band" is used by a small number of devices, the "5 GHz band" is less affected by a microwave oven and the like and may be expected to conduct a stable communication. Meanwhile, when a blocking object exists, the "5 GHz band" is easily affected by the blocking object, as compared to the "2.4 GHz band," and may not conduct a stable communication as the walls increase.

In the above-described IEEE802.11ad of the 60 GHz band, while the possible communication distance is as short as about 10 m, a large capacity and high-speed communication may be conducted. Although IEEE802.11ad of the 60 GHz may not pass over a blocking object due to the strong straight traveling property, the transmission and reception characteristic may be improved by adopting the directivity control by multiple antennas. As described above, since merits and demerits exist depending on the transmission methods, it is effective to switch to another transmission method even during a communication.

In addition, it may be effective to switch to another channel even during a communication.

The range of frequencies that may be used in a wireless communication is fixed. A frequency band to be used is divided into "channels" within the range such that multiple communication devices may conduct communications simultaneously using different channels.

In IEEE802.11b/g/n using the 2.4 GHz band, the frequency band is divided into 13 channels of 1 ch to 13 ch each having the channel width of 20 MHz in Japan and Europe. The frequency band is divided into 11 channels of 1 ch to 11 ch each having the channel width of 20 MHz in the United States.

In IEEE802.11a/n/ac using the 5 GHz band, the frequency band is divided into 19 channels of 36 ch to 64 ch and 100 ch to 140 ch each having the channel width of 20/40 MHz and 80/160 MHz.

In IEEE802.11ad using the 60 GHz band, the frequency band is divided into four channels of 1 ch to 4 ch each having the channel width of 9 GHz.

As illustrated in the example of FIG. 4A, in IEEE802.11b/g/n using the 2.4 GHz band in Japan, for example, 1 ch has the center frequency of 2,412 MHz and the band of 2,401 MHz to 2,423 MHz, 2 ch has the center frequency of 2,417 MHz and the band of 2,406 MHz to 2,428 MHz, 3 ch has the center frequency of 2,422 MHz and the band of 2,411 MHz to 2,433 MHz, 4 ch has the center frequency of 2,417 MHz and the band of 2,416 MHz to 2,438 MHz, 5 ch has the center frequency of 2,432 MHz and the band of 2,421 MHz to 2,443 MHz, 6 ch has the center frequency of 2,437 MHz and the band of 2,426 MHz to 2,448 MHz, 7 ch has the center frequency of 2,442 MHz and the band of 2,431 MHz to 2,453 MHz, 8 ch has the center frequency of 2,447 MHz and the band of 2,436 MHz to 2,458 MHz, 9 ch has the center frequency of 2,452 MHz and the band of 2,441 MHz to 2,463 MHz, 10 ch has the center frequency of 2,457 MHz and the band of 2,446 MHz to 2,468 MHz, 11 ch has the center frequency of 2,462 MHz and the band of 2,451 MHz to 2,473 MHz, 12 ch has the center frequency of 2,467 MHz and the band of 2,456 MHz to 2,478 MHz, 13 ch has the center frequency of 2,472 MHz and the band of 2,461 MHz to 2,483 MHz, 14 ch has the center frequency of 2,484 MHz and the band of 2,473 MHz to 2,495 MHz.

As described above, the frequency band of a channel overlaps with the frequency band of an adjacent channel. This is called an "overlap." Specifically, in a case of the "channel width of 20 MHz," three channels overlap with each other in the front and rear portions. In a case of the "channel width of 22 MHz," four channels overlap with each other in the front and rear portions. These channels are in the mutually interfering relationship.

That is, when one unit uses "1 ch" and another unit uses "2 ch" in a wireless communication, the channels interfere with each other. As a result, the communication may become unstable.

In a case where three (or four) channels overlap with each other, shifting the channels by the number of overlapping channels+1 avoids interference between the channels. If "1 ch, 5 ch, 9 ch, and 13 ch" are used in the case of the "channel width of 20 MHz," and "1 ch, 6 ch, 11 ch (2 ch, 7 ch, and 12 ch or 3 ch, 8 ch, and 13 ch)" are used in the case of the "channel width of 22 MHz," the communication becomes stable. Thus, the channels that may be expected to conduct a stable communication (non-overlapping channels) are the four (or three) channels.

As illustrated in the example of FIG. 4B, in IEEE802.11a/n/ac using the 5 GHz band, 19 channels are present in Japan and Europe. Not illustrated in FIG. 4B, in IEEE802.11a/n/ac using the 5 GHz band, 24 channels are present in the United States. The frequency bands of the respective channels are independent and do not interfere with each other. That is, the interference does not occur even if an adjacent channel is allocated. Thus, if the 5 GHz band is used, not only the interference with other devices disappears but also the interference with the channels disappears.

In addition, as the switching between the channels, a "channel bonding" function (a high speed mode) may be included. That is, as the switching between the channels, added are switching of a wireless communication which does not use the channel bonding function to a wireless communication which uses the channel bonding function, switching of a wireless communication which uses the channel bonding function to a wireless communication which does not use the channel bonding function and switching between wireless communications that use the channel bonding function. The channel bonding function is a technique of using two channels simultaneously and bonding the channels to each other so as to increase the communication speed. For example, the band occupied by one channel is 20 MHz. If the bands of two channels are bonded to each other, a communication is conducted in the 40 MHz band. It should be noted that if the channel bonding function is used, the number of available channels decreases, and the interference may easily occur. Further, a master device and an associated device are required to conform to the channel bonding function.

In addition, as the switching of a transmission method, "multiple input, multiple output (MIMO)" may be included. That is, as the switching between the transmission methods, added are changing of a wireless communication which does not use the MIMO to a wireless communication which uses the MIMO, changing of a wireless communication which uses the MIMO to a wireless communication which does not use the MIMO, and changing between antennas according to the MIMO The MIMO is a technique in which both a transmitter and a receiver use multiple antennas in a wireless communication so as to implement a high speed communication. In addition, a master device and an associated device are required to conform to the MIMO.

Figure 5:
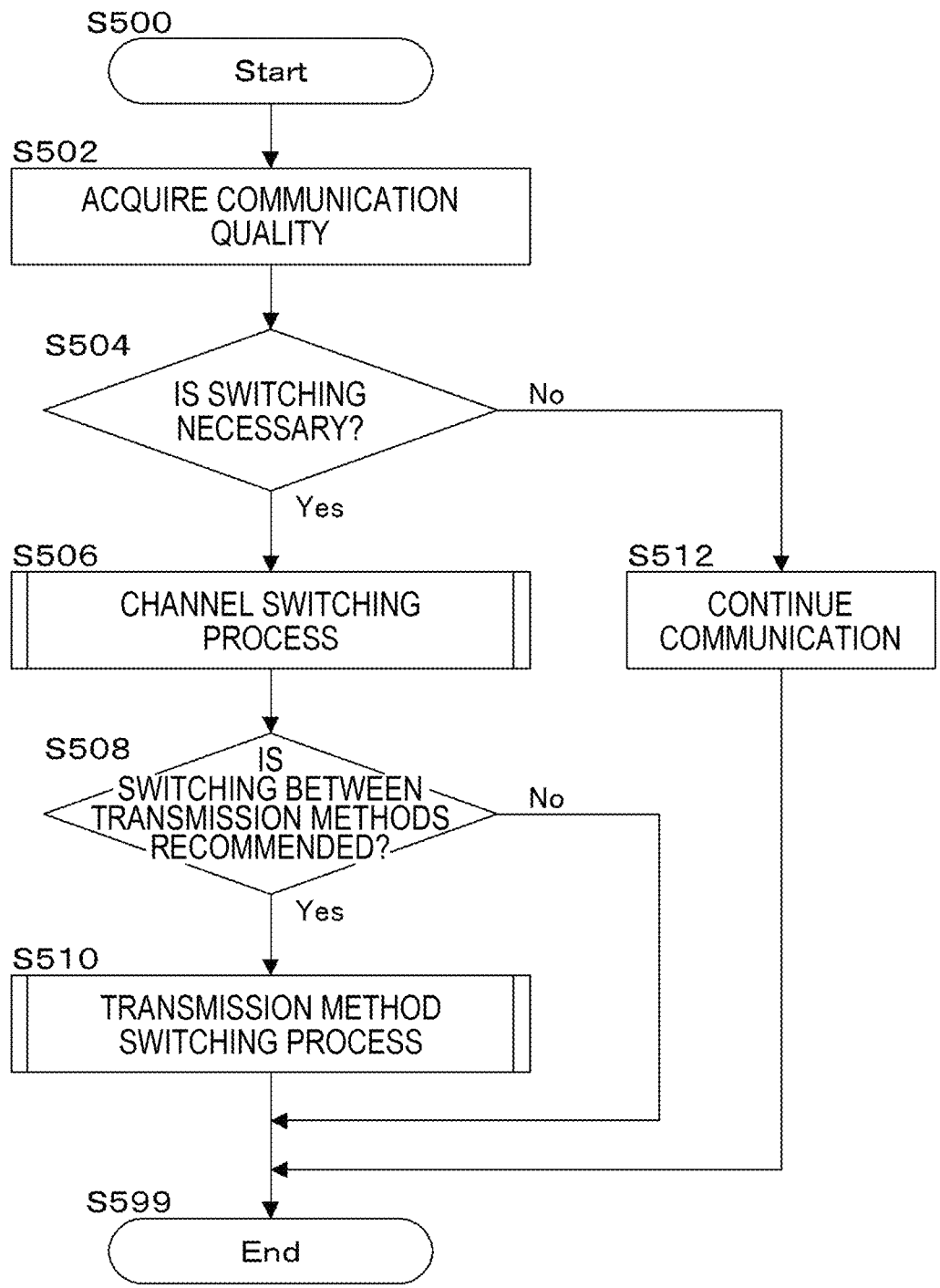
FIG. 5 is a flowchart illustrating an exemplary process according to the first exemplary embodiment.

FIG. 5 is a flowchart illustrating an exemplary process according to the first exemplary embodiment (information processing apparatus 100).

In step S502, the communication quality acquisition module 115 acquires the communication quality. The communication quality acquisition module 115 acquires the communication quality during the communication based on a signal received from the communication device 180 as a counterpart device. As described above, for example, a wireless communication speed, a reception level of a radio signal, and an occurrence of disconnection of a wireless communication during the communication are detected.

In step S504, the switching determination module 120 determines whether the switching is necessary. If it is determined that the switching is necessary, the process proceeds to step S506. Otherwise, the process proceeds to step S512. That is, it is determined whether (i) to continue the communication as it is or (ii) to change a channel and conduct a communication again (conduct a communication from the connection again).

In step S506, the channel switching module 125 performs a channel switching process. The detailed process of step S506 will be described later using a flowchart illustrated in an example of FIG. 6.

In step S508, the transmission method switching module 130 determines whether a transmission method switching is recommended. If it is determined that the recommendation is made, the process proceeds to step S510. Otherwise, the communication using a new channel is continued.

In step S510, the transmission method switching module 130 performs a transmission method switching process. The detailed process of step S510 will be described later using a flowchart illustrated in an example of FIG. 9.

In step S512, the wireless communication module 135 continues the communication by the current transmission method and the current channel.

Figure 6:
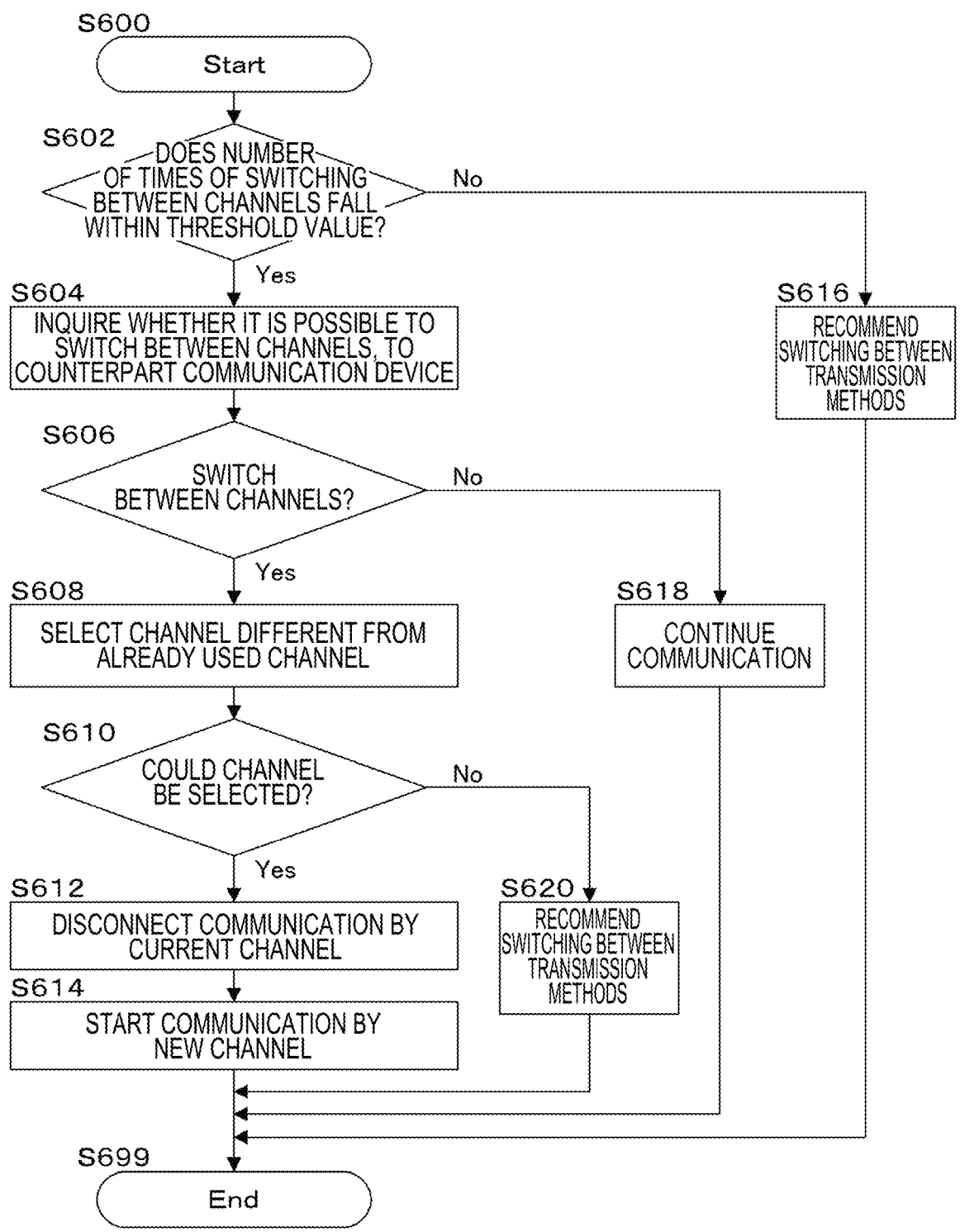
FIG. 6 is a flowchart illustrating an exemplary process according to the first exemplary embodiment.

FIG. 6 is a flowchart illustrating an exemplary process according to the first exemplary embodiment (channel switching module 125).

In step S602, it is determined whether the number of times of switching between the channels in the communication falls within a threshold value. If it is determined that the number of times of switching between the channels falls within the threshold value, the process proceeds to step S604. Otherwise, the process proceeds to step S616.

In step S604, it is inquired whether it is possible to switch between the channels, to the communication device 180 which is the communication counterpart device.

In step S606, it is determined whether a reply from the communication device 180 indicates switching between the channels. If it is determined that the reply indicates switching between the channels, the process proceeds to step S608. Otherwise, the process proceeds to step S618.

In step S608, a channel different from the already used channel is selected. For example, the different channel is selected using the channel use table 700 and the channel use table 800.

Figure 7:
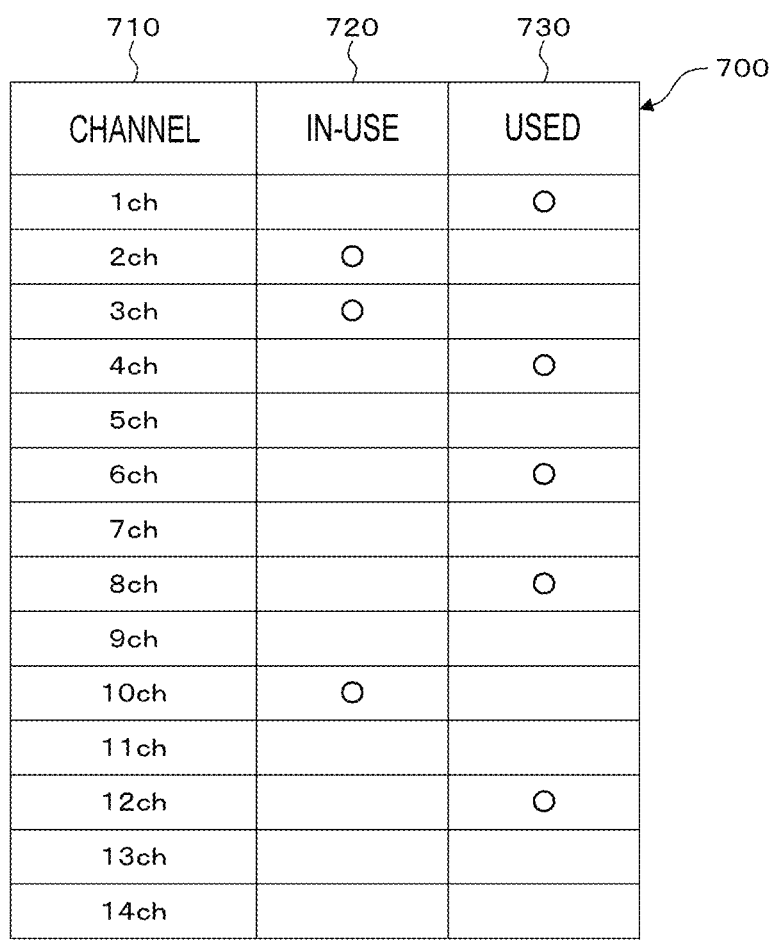
FIG. 7 is an explanatory view illustrating an exemplary data structure of a channel use table.

FIG. 7 is an explanatory view illustrating an exemplary data structure of the channel use table 700. The channel use table 700 has a channel column 710, am in-use column 720, and a used column 730. The channel use table 700 is used for the transmission method of IEEE802.11b/g/n using the frequency band of 2.4 GHz. The channel column 710 stores channels. The in-use column 720 stores whether each channel is currently in use. The used column 730 stores whether each channel was already used in a target communication. By excluding the already used channels, an occurrence of an endless loop is avoided.

In FIG. 7, the mark "o" indicates "currently in use" or "already used". Specifically, a channel that is not marked in the in-use column 720 and the used column 730 (a channel that is not indicated with the mark "o") is selected. In addition, as described above, a channel of a frequency band that does not overlap with a channel that is currently in use or was already used may be selected.

FIG. 8 is an explanatory view illustrating an exemplary data structure of the channel use table 800. The channel use table 800 has a channel column 810, an in-use column 820, and a used column 830. The channel use table 800 is used for the transmission method of IEEE802.11a/n/ac using the frequency band of 5 GHz. The channel column 810 stores channels. The in-use column 820 stores whether each channel is currently in use. The used column 830 stores whether each channel was already used in a target communication. By excluding the already used channels, an occurrence of an endless loop is avoided.

In FIG. 8, the mark "o" indicates "currently in use" or "already used". Specifically, a channel that is not marked in the in-use column 820 and the used column 830 (a channel that is not indicated with the mark "o") is selected.

In step S610, it is determined whether a channel could be selected in step S608. If it is determined that a channel could be selected, the process proceeds to step S612. Otherwise, the process proceeds to step S620.

In step S612, the communication by the current channel is disconnected.

In step S614, a communication is started by the new channel. At this time, a communication may be newly started from the beginning. Alternatively, only the remaining communication that could not be transmitted in the communication that has been conducted until now may be conducted.

In step S616, switching between the transmission methods is recommended, and the process is ended (step S699). That is, in step S508 of the flowchart illustrated in the example of FIG. 5, it is determined that the answer is "Yes."

In step S618, the communication by the current channel is continued, and the process is ended (step S699).

In step S620, switching between the transmission methods is recommended, and the process is ended (step S699). That is, in step S508 of the flowchart illustrated in the example of FIG. 5, it is determined that the answer is "Yes."

Figure 9:
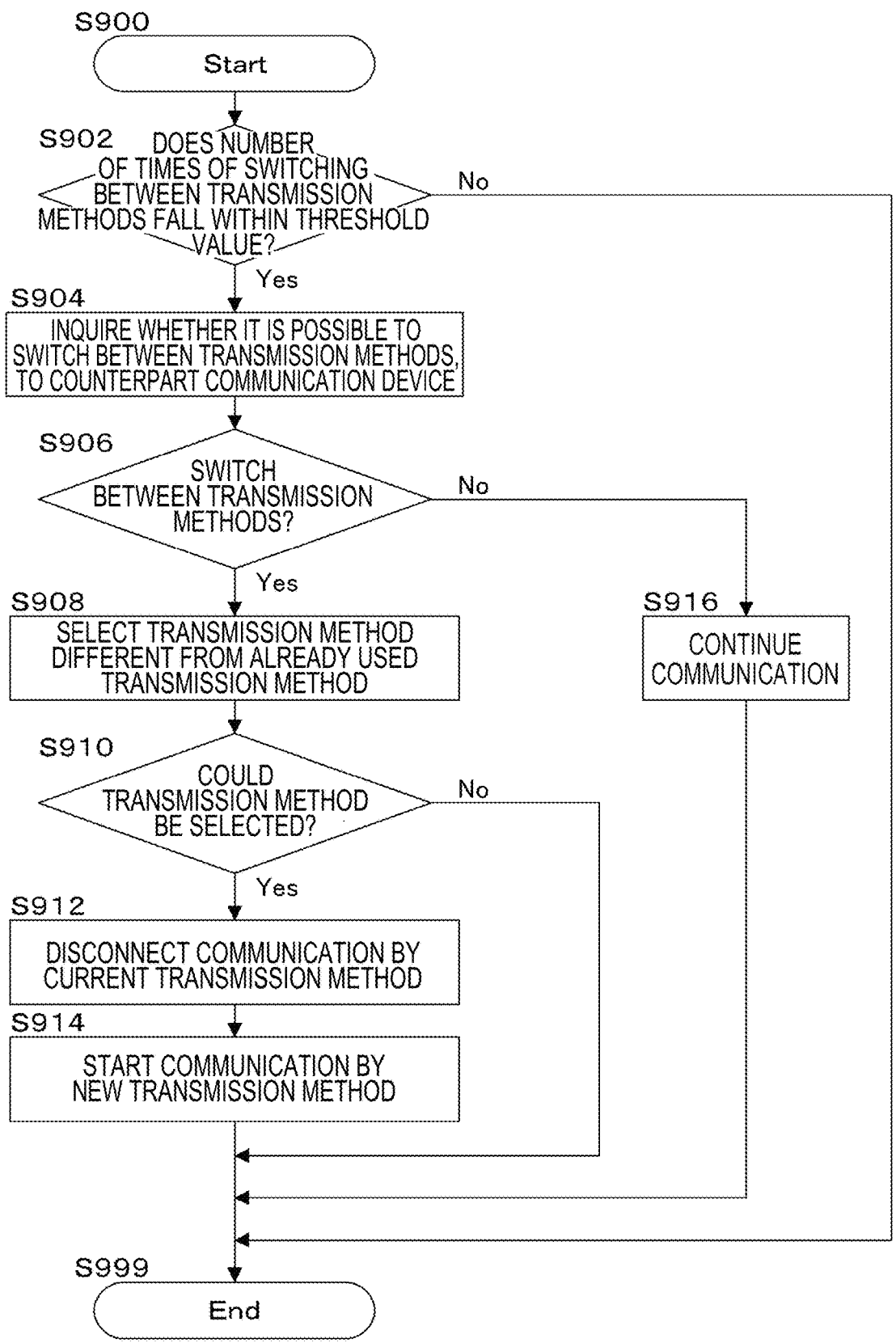
FIG. 9 is a flowchart illustrating an exemplary process according to the first exemplary embodiment.

FIG. 9 is a flowchart illustrating an exemplary process according to the first exemplary embodiment (transmission method switching module 130).

In step S902, it is determined whether the number of times of switching between the transmission methods in a communication in interest falls within a threshold value. If it is determined that the number of times of the transmission method switching falls within the threshold value, the process proceeds to step S904. Otherwise, the process is ended (step S999; that is, the communication is continued as it is).

In step S904, it is inquired whether it is possible to switch between the transmission methods, to the communication device 180 which is the communication counterpart device.

In step S906, it is determined whether a reply from the communication device 180 indicates switching between the transmission methods. If it is determined that the reply indicates performing the transmission method switching, the process proceeds to step S908. Otherwise, the process proceeds to step S916.

In step S908, a transmission method different from the already used transmission method is selected. For example, the different transmission method is selected using the transmission method use table 1000.

FIG. 10 is an explanatory view illustrating an exemplary data structure of the transmission method use table 1000. The transmission method use table 1000 includes a transmission method column 1010, an in-use column 1020, and a used column 1030. The transmission method column 1010 stores transmission methods. The in-use column 1020 stores whether each transmission method is currently in use. The used column 1030 stores whether each transmission method was already used in a target communication. By excluding the already used transmission methods, an occurrence of an endless loop is avoided.

In step S910, it is determined whether a transmission method could be selected in step S908. If it is determined that a transmission method could be selected, the process proceeds to step S912. Otherwise, the process is ended (step S999).

In step S912, the communication by the current transmission method is disconnected.

In step S914, a communication is started by the new transmission method. At this time, a communication may be newly started from the beginning. Alternatively, only the remaining communication that could not be transmitted in the communication that has been conducted until now may be conducted.

In step S916, the communication is continued, and the process is ended (step S999).

Second Exemplary Embodiment

Figure 11:
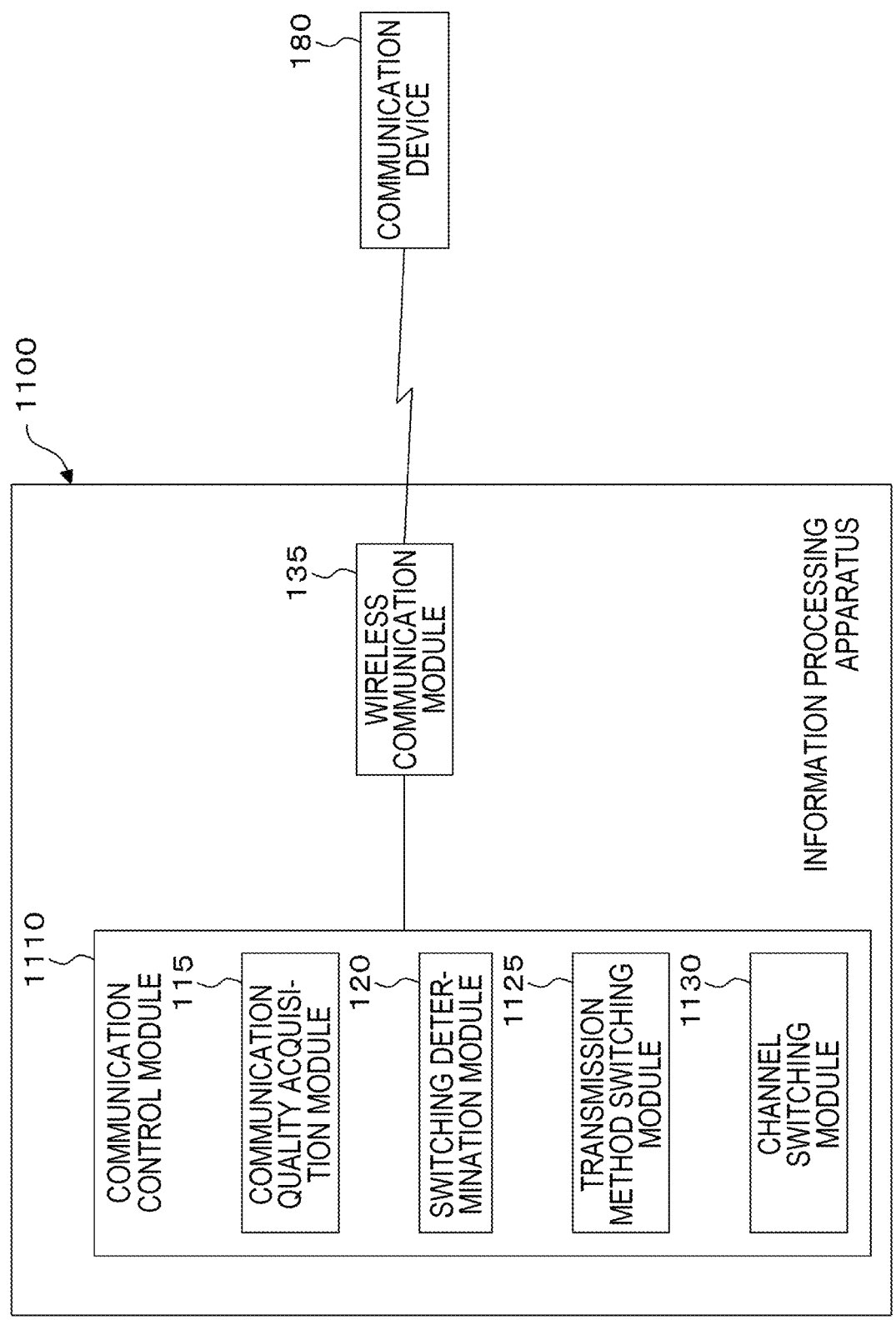
FIG. 11 is a conceptual module configuration diagram illustrating an exemplary configuration of a second exemplary embodiment.

FIG. 11 is a conceptual module configuration diagram illustrating an exemplary configuration of a second exemplary embodiment. In addition, portions similar to that in the first exemplary embodiment will be denoted by the same reference numeral as those in the first exemplary embodiment, and redundant description thereof will be omitted (this will also be applied to descriptions of a third exemplary embodiment).

The information processing apparatus 1100 of the second exemplary embodiment conducts a wireless communication. The information processing apparatus 1100 includes a communication control module 1110 and a wireless communication module 135 as illustrated in the example of FIG. 11.

The communication device 180 is connected to the wireless communication module 135 of the information processing apparatus 1100 via a communication line.

The wireless communication module 135 is connected to the communication control module 1110 and also connected to a communication device 180 via a communication line.

The communication control module 1110 includes a communication quality acquisition module 115, a switching determination module 120, a transmission method switching module 1125, and a channel switching module 1130. The communication control module 1110 is connected to the wireless communication module 135. The communication control module 1110 controls wireless communication between the information processing apparatus 1100 and the communication device 180.

The switching determination module 120 determines whether to switch the communication that is being conducted by the wireless communication module 135, based on the communication quality acquired by the communication quality acquisition module 115. The switching is performed when the communication quality is deteriorated. For example, if the wireless communication speed or the reception level of a radio signal acquired by the communication quality acquisition module 115 is lower than a predetermined threshold value, switching by the transmission method switching module 1125 or the channel switching module 1130 is performed. In addition, if the communication quality acquisition module 115 detects disconnection of a wireless communication during the communication (or if the number of times of the disconnection is larger than a predetermined threshold value or the disconnection time is longer than predetermined time), switching by the transmission method switching module 1125 or the channel switching module 1130 is performed.

The transmission method switching module 1125 switches between transmission methods according to the communication quality of the communication that is being conducted by the wireless communication module 135. Here, the description "according to the quality of the communication that is being conducted" corresponds to, for example, a case where the wireless communication speed is slow, the reception level of a radio signal is low, or communication is disconnected during the communication, in the communication device 180 which is a communication counterpart. "Switching between the transmission methods" includes, for example, switching from IEEE802.11b to IEEE802.11n. In addition, the switching may be a switching from an identical frequency band to another frequency band. For example, the switching may switch from a transmission method of 2.4 GHz to a transmission method of 5 GHz. That is, switching between the transmission methods within the same frequency band may not be performed.

In addition, the transmission method switching module 1125 may switch between transmission methods when the number of times of the switching is less than or equal to or less than a predetermined value.

In addition, the transmission method switching module 1125 may switch a transmission method to a transmission method different from an already selected transmission method.

In addition, the transmission method switching module 1125 may switch a transmission method to IEEE802.11ad.

In addition, the transmission method switching module 1125 may switch a transmission method to a predetermined transmission method and channel. It should be noted that the "predetermined transmission method and the predetermined channel" may include predetermined multiple transmission methods and predetermined multiple channels. In this case, the predetermined multiple transmission methods and the predetermined multiple channels may be displayed as multiple selection options so that an operator is selectable. In addition, priorities may be set.

In addition, the transmission method switching module 1125 may determine the "predetermined transmission method and channel" when the information processing apparatus 1100 is installed.

The channel switching module 1130 switches between channels when the transmission method switching module 1125 could not switch a transmission mode. Here, "switching between channels" includes, for example, changing a frequency.

In addition, when the number of times of the switching by the transmission method switching module 1125 is more than or equal to or more than a predetermined value, the switching by the channel switching module 1130 may be performed.

In addition, when the transmission method switching module 1125 could not select a transmission method different from an already selected transmission method, the switching by the channel switching module 1130 may be performed.

Figure 12:
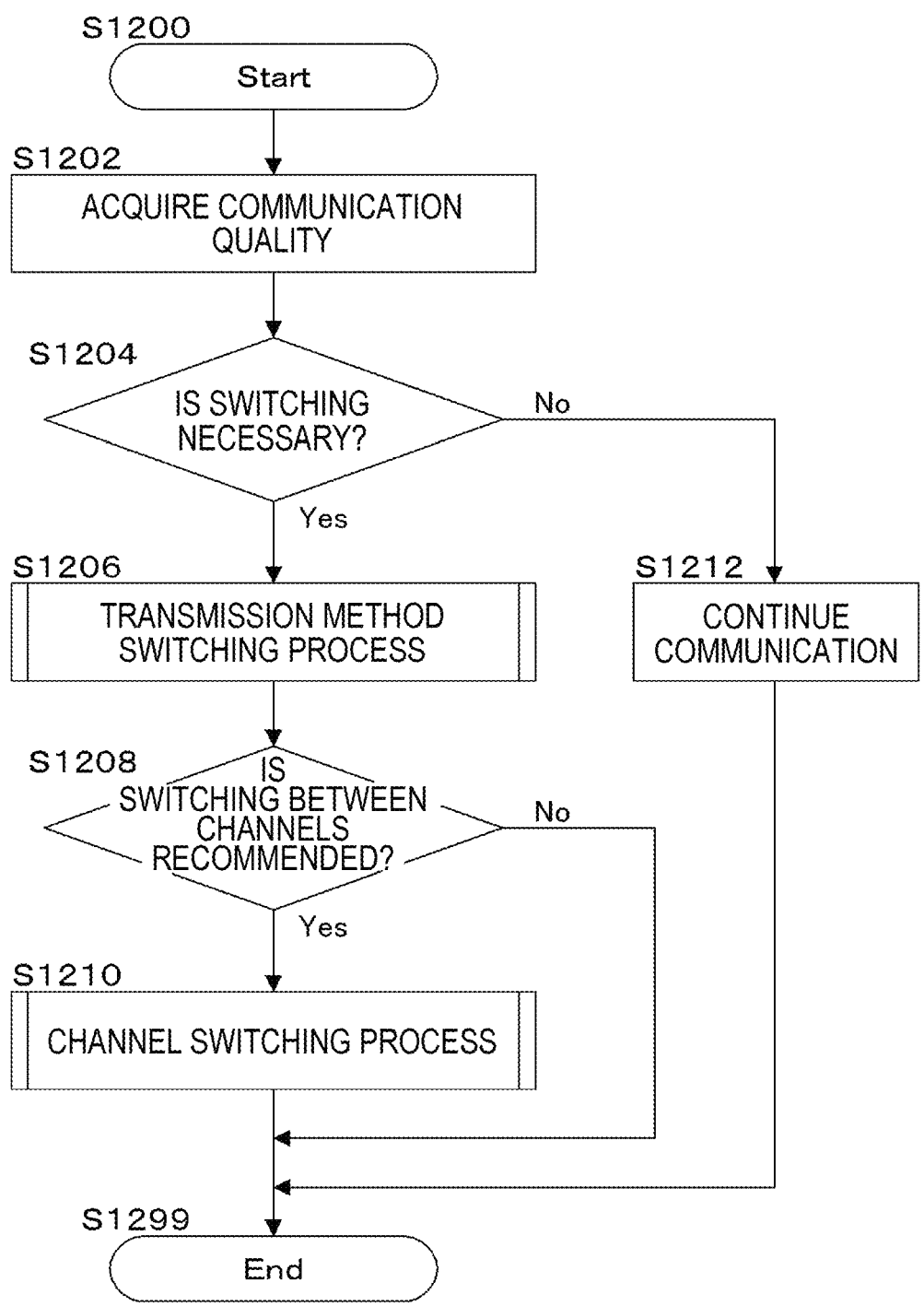
FIG. 12 is a flowchart illustrating an exemplary process according to the second exemplary embodiment.

FIG. 12 is a flowchart illustrating an exemplary process according to the second exemplary embodiment (information processing apparatus 1100).

In step S1202, the communication quality acquisition module 115 acquires the communication quality. The communication quality acquisition module 115 acquires the communication quality during the communication based on a signal received from the communication device 180 as a counterpart device. As described above, for example, a wireless communication speed, a reception level of a radio signal, and an occurrence of disconnection of a wireless communication during the communication are detected.

In step S1204, the switching determination module 120 determines whether a switching is necessary. If it is determined that a switching is necessary, the process proceeds to step S1206. Otherwise, the process proceeds to step S1212. That is, it is determined whether (i) to continue the communication as it is or (ii) to change a transmission method and conduct a communication again (whether to conduct a communication from the connection again).

In step S1206, the transmission method switching module 1125 performs a transmission method switching process. The detailed process of step S1206 will be described later using the flowchart illustrated in an example of FIG. 13.

In step S1208, the channel switching module 1130 determines whether switching between channels is recommended. If it is determined that the recommendation is made, process proceeds to step S1210. Otherwise, the communication using the new transmission method is continued.

In step S1210, the channel switching module 1130 performs a channel switching process. The detailed process of step S1210 will be described later using the flowchart illustrated in an example of FIG. 14.

In step S1212, the wireless communication module 135 continues the communication by the current transmission method and the current channel.

Figure 13:
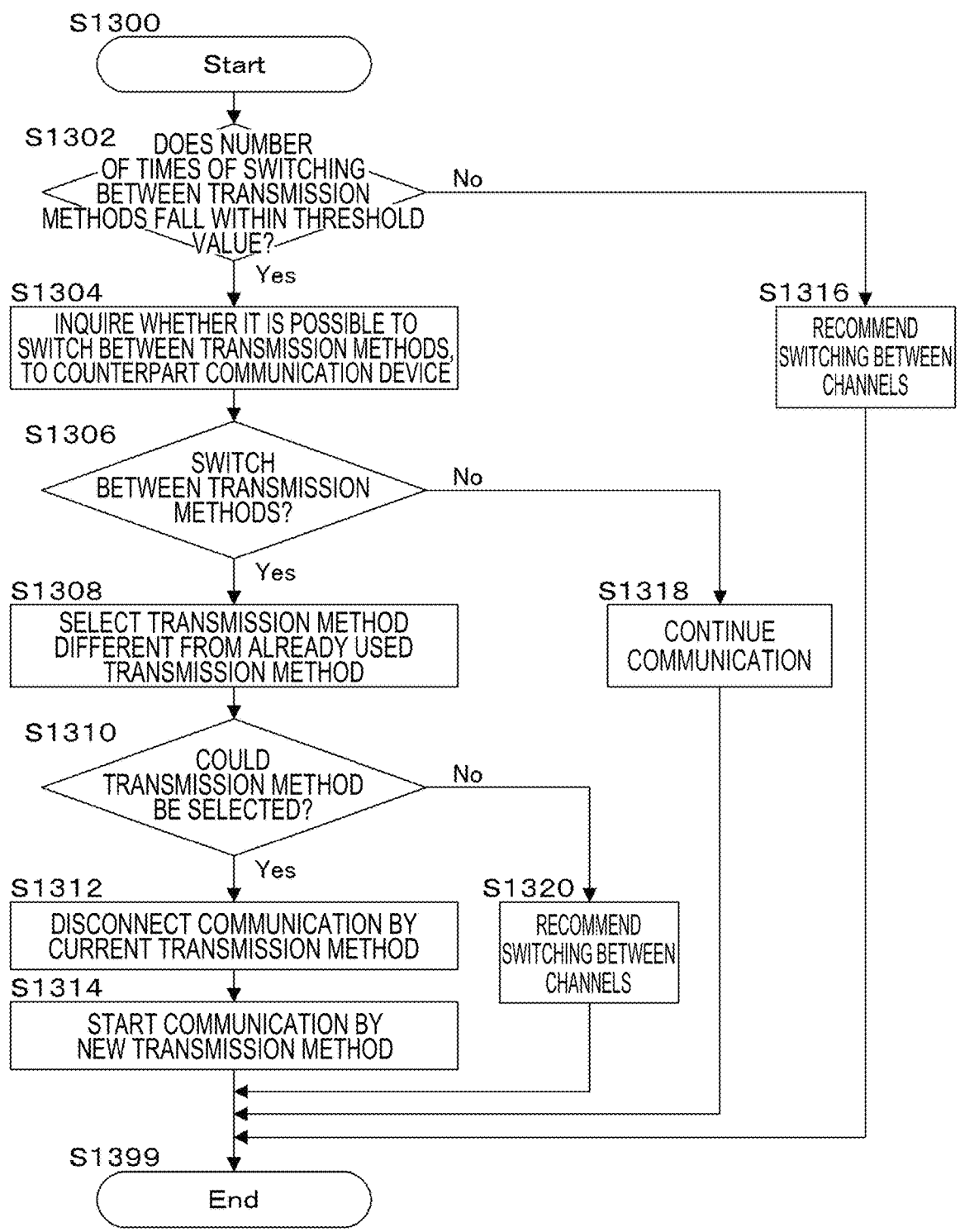
FIG. 13 is a flowchart illustrating an exemplary process according to the second exemplary embodiment.

FIG. 13 is a flowchart illustrating an exemplary process according to the second exemplary embodiment (transmission method switching module 1125).

In step S1302, it is determined whether the number of times of the transmission method switching falls within a threshold value. If it is determined that the number of times of the transmission method switching falls within a threshold value, the process proceeds to step S1304. Otherwise, the process proceeds to step S1316.

In step S1304, it is inquired whether it is possible switch between the transmission methods, to the communication device 180 which is a communication counterpart device.

In step S1306, it is determined whether a reply from the communication device 180 indicates switching between the transmission methods. If it is determined that the reply indicates switching between the transmission methods, the process proceeds to step S1308. Otherwise, the process proceeds to step S1318.

In step S1308, a different transmission method from the already used transmission method is selected. For example, the different transmission method is selected using the transmission method use table 1000.

In step S1310, it is determined whether a transmission method could be selected in step S1308. If it is determined that a transmission method could be selected, the process proceeds to step S1312. Otherwise, the process proceeds to step S1320.

In step S1312, the communication by the current transmission method is disconnected.

In step S1314, communication is started by the new transmission method. At this time, a communication may be newly started from the beginning. Alternatively, only the remaining communication that could not be transmitted in the communication that has been conducted until now may be conducted.

In step S1316, switching between the channels is recommended, and the process is ended (step S1399). That is, the determination at step S1208 in the flowchart illustrated in the example of FIG. 12 is "Yes."

In step S1318, the communication by the current transmission method is continued, and the process is ended (step S1399).

In step S1320, switching between the channels is recommended, and the process is ended (step S1399). That is, the determination at step S1208 in the flowchart illustrated in the example of FIG. 12 is "Yes."

Figure 14:
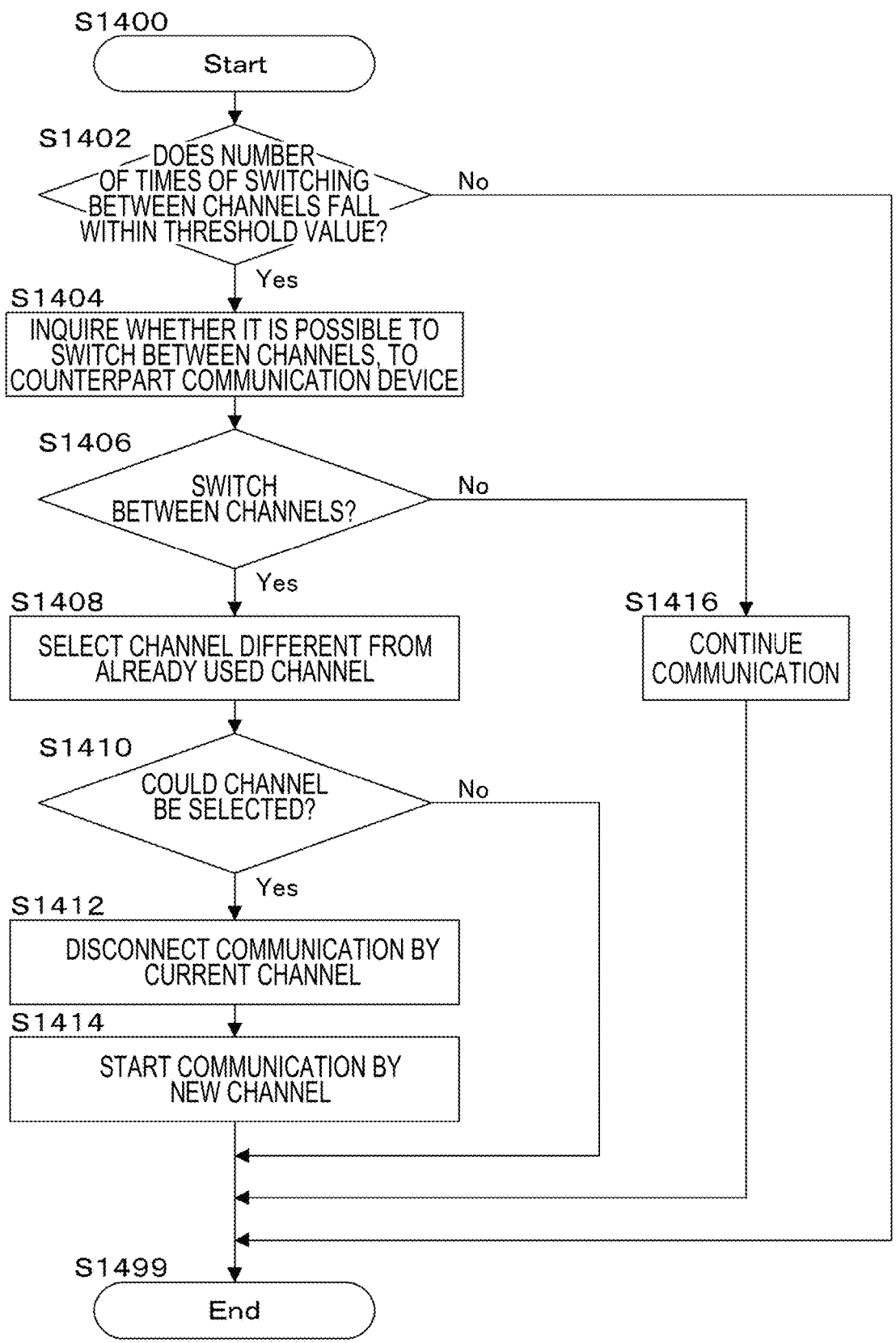
FIG. 14 is a flowchart illustrating an exemplary process according to the second exemplary embodiment.

FIG. 14 is a flowchart illustrating an exemplary process according to the second exemplary embodiment (channel switching module 1130).

In step S1402, it is determined whether the number of times of switching between the channels falls within a threshold value. If it is determined that the number of times of switching between the channels falls within a threshold value, the process proceeds to step S1404. Otherwise, the process is ended (step S1499; that is, the communication is continued).

In step S1404, it is inquired whether it is possible to switch between the channels, to the communication device 180 which is a communication counterpart device.

In step S1406, it is determined whether a reply from the communication device 180 indicates switching between the channels. If it is determined that the reply indicates switching between the channels, the process proceeds to step S1408. Otherwise, the process proceeds to step S1416.

In step S1408, a channel different from the already used channel is selected. For example, the different channel is selected using the channel use table 700 and the channel use table 800.

In step S1410, it is determined whether a channel could be selected in step S1408. If it is determined that a channel could be selected, the process proceeds to step S1412. Otherwise, the process is ended (step S1499).

In step S1412, the communication by the current channel is disconnected.

In step S1414, communication is started by the new channel. At this time, a communication may be newly started from the beginning. Alternatively, only the remaining communication that could not be transmitted in the communication that has been conducted until now may be conducted.

In step S1416, the communication by the current channel is continued, and the process is ended (step S1499).

Figure 15:
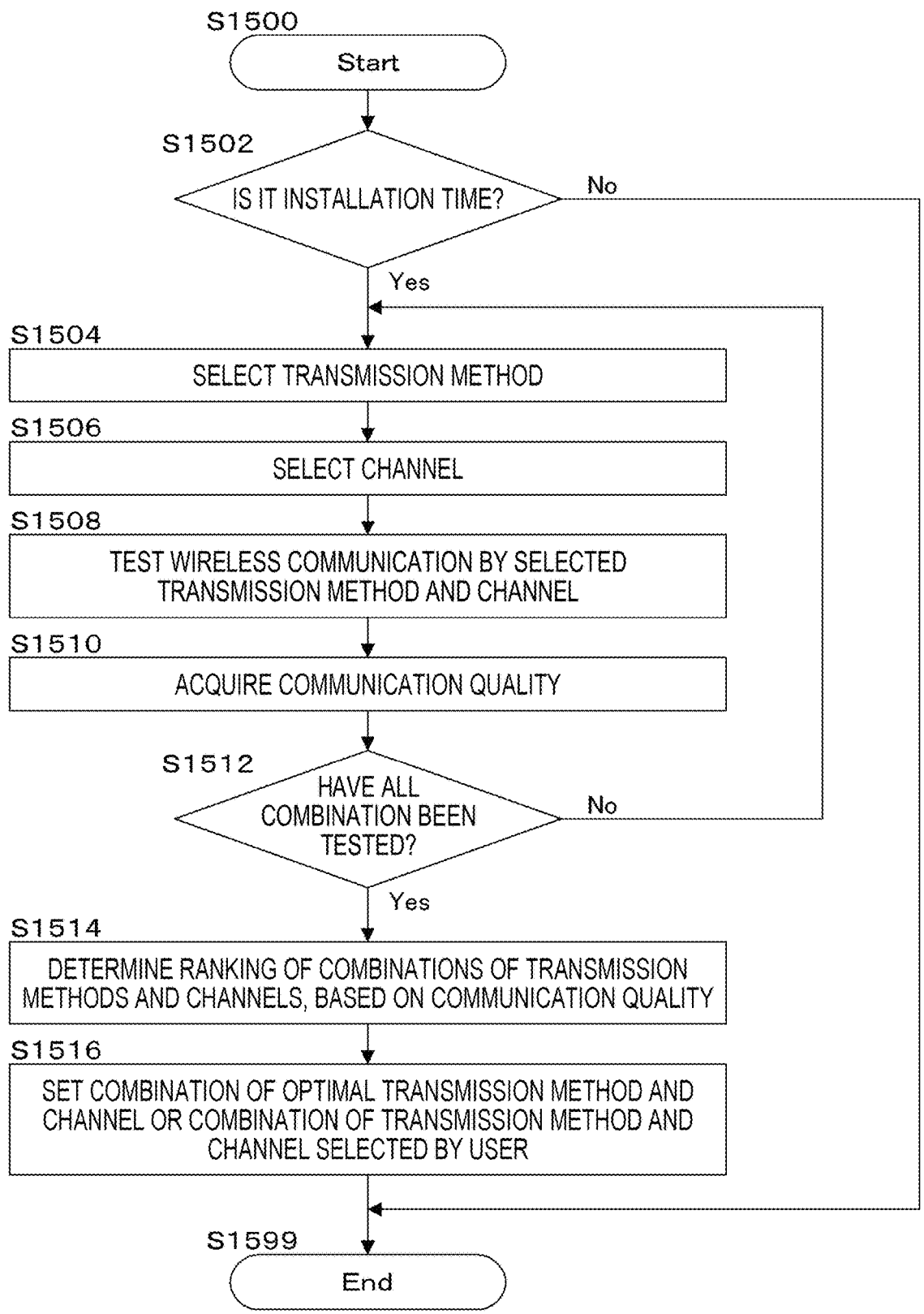
FIG. 15 is a flowchart illustrating an exemplary process according to the second exemplary embodiment.

FIG. 15 is a flowchart illustrating an exemplary process according to the second exemplary embodiment (information processing apparatus 1100). The following configuration may be employed. That is, the information processing apparatus 1100 automatically sends a radio signal by a diagnosis function (a self-diagnosis function) of the information processing apparatus 1100 when the information processing apparatus 1100 is installed. The information processing apparatus 1100 receives a reception signal from a counterpart device and automatically selects a combination of optimal transmission method and channel according to obtained detection data.

In step S1502, it is determined whether it is the installation time of the information processing apparatus 1100 (the initial setting time). If it is determined that it is the installation time, the process proceeds to step S1504. Otherwise, the process is ended (step S1599). This is because main communication environments (place and area) are determined at the installation time of the information processing apparatus 1100.

In step S1504, a transmission method is selected. An order in which a target transmission method is selected from among multiple transmission methods may be determined in advance.

In step S1506, a channel is selected. An order in which a target channel is selected from among multiple channels may be determined in advance.

In step S1508, a test wireless communication is conducted by the transmission method and the channel selected in steps S1504 and S1506.

In step S1510, the communication quality is acquired.

In step S1512, it is determined whether all combinations have been tested. If it is determined that all the combinations have been tested, the process proceeds to step S1514. Otherwise, the process returns to step S1504.

In step S1514, ranking of the combinations of the transmission methods and the channels is determined based on the communication quality. That is, a combination having a better communication quality ranks high.

In step S1516, a combination of optimal transmission method and channel or a combination of a transmission method and a channel that are selected by a user is set. If there are multiple combinations of transmission methods and channels that have better communication qualities than a predetermined value, a user may select one from the multiple combinations.

A combination of a transmission method and a channel that have a better communication quality than the predetermined value may be used as follows:

If it is determined in step S504 of the flowchart illustrated in the example of FIG. 5 or step S1204 of the flowchart illustrated in the example of FIG. 12 that a switching is necessary, the transmission method may be switched to the ranked communication of the transmission method and the channel.

Third Exemplary Embodiment

Figure 16:
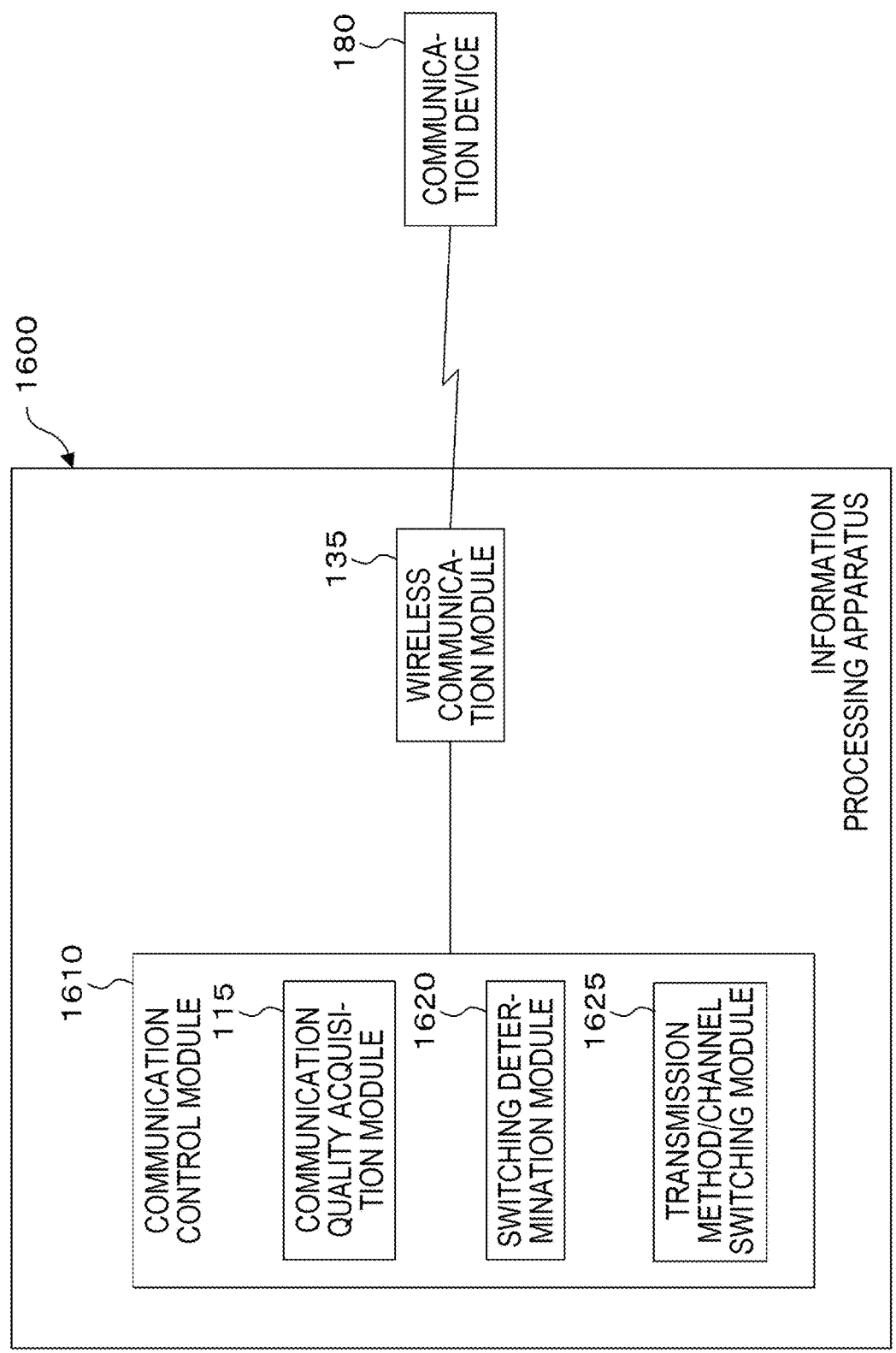
FIG. 16 is a conceptual module configuration diagram illustrating an exemplary configuration of a third exemplary embodiment.

FIG. 16 is a conceptual module configuration diagram illustrating an exemplary configuration of a third exemplary embodiment.

The information processing apparatus 1600 of the third exemplary embodiment conducts a wireless communication. The information processing apparatus 1600 includes a communication control module 1610 and a wireless communication module 135 as illustrated in the example of FIG. 16.

The communication device 180 is connected to the wireless communication module 135 of the information processing apparatus 1600 via a communication line. For example, there may be a case where multiple communication devices 180 each equipped with WiGig exist, and communication devices 180 the number of which is larger than the number of communication lines capable of conducting the WiGig communication request a communication to the information processing apparatus 1600. This case corresponds to, for example, a case where a communication device 180 serving as an authentication device, another communication device 180 serving as a storage device, further another communication device 180 serving as a display device, and the like request a communication. In this case, one of the communication devices 180 conduct a communication by WiGig and other ones of the communication devices 180 conduct a communication by transmission methods other than WiGig (transmission methods having a slower communication speed than WiGig). However, in general, communication times of the communication devices 180 are different from each other. Thus, when the communication of the communication device 180 conducting a communication by WiGig is ended, the information processing apparatus 1600 switches the transmission method of another communication device 180 to WiGig even though the other communication device 180 has already conducted a communication by a transmission method other than WiGig. As a result, the communication may be completed faster than the case where the communication by the transmission method other than WiGig is continued.

The wireless communication module 135 is connected to the communication control module 1610 and also connected to the communication device 180 via a communication line.

The communication control module 1610 includes a communication quality acquisition module 115, a switching determination module 1620, and a transmission method/channel switching module 1625. The communication control module 1610 is connected to the wireless communication module 135. The communication control module 1610 controls the wireless communication between the information processing apparatus 1600 and the communication device 180.

The communication quality acquisition module 115 acquires the quality of a communication that is being conducted using the wireless communication module 135. Here, the "quality of a communication" (communication quality) includes a transmission quality, a connection quality, and a stability quality. For example, the quality of a communication includes a communication speed (for example, speed, delay, and responsiveness), stability (for example, data loss rate and reliability), a coverage range and others, and specifically corresponds to detecting a communication speed per unit time, a reception level of a radio signal, an occurrence of disconnection of a wireless communication during the communication and others.

Further, the communication quality acquisition module 115 detects that a channel or transmission method that could not be selected has become able to communicate, when selecting a target communication (a communication that is being conducted). Here, the description "something could not be selected" indicates, for example, a case where a communication is being conducted by something or a case where a communication could not be conducted by something due to a communication error or the like. Accordingly, examples of the description "something has become able to communicate" include a case where something in communication ends the communication and a case where a communication error or the like is removed so something can communicate.

Then, the communication quality acquisition module 115 acquires the communication quality of the channel or transmission method that has become able to communicate. If the communication has been conducted until that time, the communication quality in the communication performance may be acquired. If a communication itself could not be conducted, a nominal value in the channel or transmission method that has become able to communicate may be acquired.

The switching determination module 1620 determines whether a channel or transmission method having a higher communication quality than the communication quality of the communication that is being conducted has become able to communicate.

Here, the description "channel or transmission method having a higher communication quality than the communication quality of the communication that is being conducted" indicates, for example, a channel or transmission method which is more superior in the communication speed, the number of errors or the like than the channel or transmission method of the communication that is being currently conducted.

In addition, a "case where a channel B1 or a transmission method B2 has become able to communicate" represents a case where since a communication using the channel B1 or the transmission method B2 could not be selected at the time of starting a communication, the communication was conducted using another channel A1 or another transmission method A2, and during the communication, the channel B1 or the transmission method B2 has become able to communicate. Here, examples of the description "a communication using the channel B1 or the transmission method B2 could not be selected" include (i) a case where a communication by the channel B1 or the transmission method B2 has already been conducted and (ii) a case where a communication by the channel B1 or the transmission method B2 could not be conducted due to an error or the like.

In addition, the switching determination module 1620 may determine whether to perform a switching, according to a remaining communication amount. Here, the description "according to a remaining communication amount" may indicate that a time required for the remaining communication when the communication by the current channel A1 or transmission method A2 is continued and a time required when a communication is started from the beginning by the channel B1 or the transmission method B2 that has become in a switchable state are compared to each other and it is determined that one of the former and the latter is shorter than the other.

When a channel or transmission method having a higher communication quality than the communication quality of the communication that is being conducted has become able to communicate, the transmission method/channel switching module 1625 switches the communication that is being conducted to the channel or transmission method having the higher communication quality. That is, the communication is switched to a channel or transmission method that improves a communication quality, according to the result of the determination by the switching determination module 1620 (the result of the determination as to whether a channel or transmission method having a higher communication quality than the communication quality of the communication that is being conducted has become able to communicate).

In addition, the transmission method/channel switching module 1625 performs a switching according to the remaining communication amount. That is, switching between channels or between transmission methods is performed according to the result of the determination by the switching determination module 1620 (the result of the determination as to whether to switch between communications according to the remaining communication amount).

In addition, when switching between the transmission methods, the transmission method/channel switching module 1625 may switch the transmission method to IEEE802.11ad.

Figure 17:
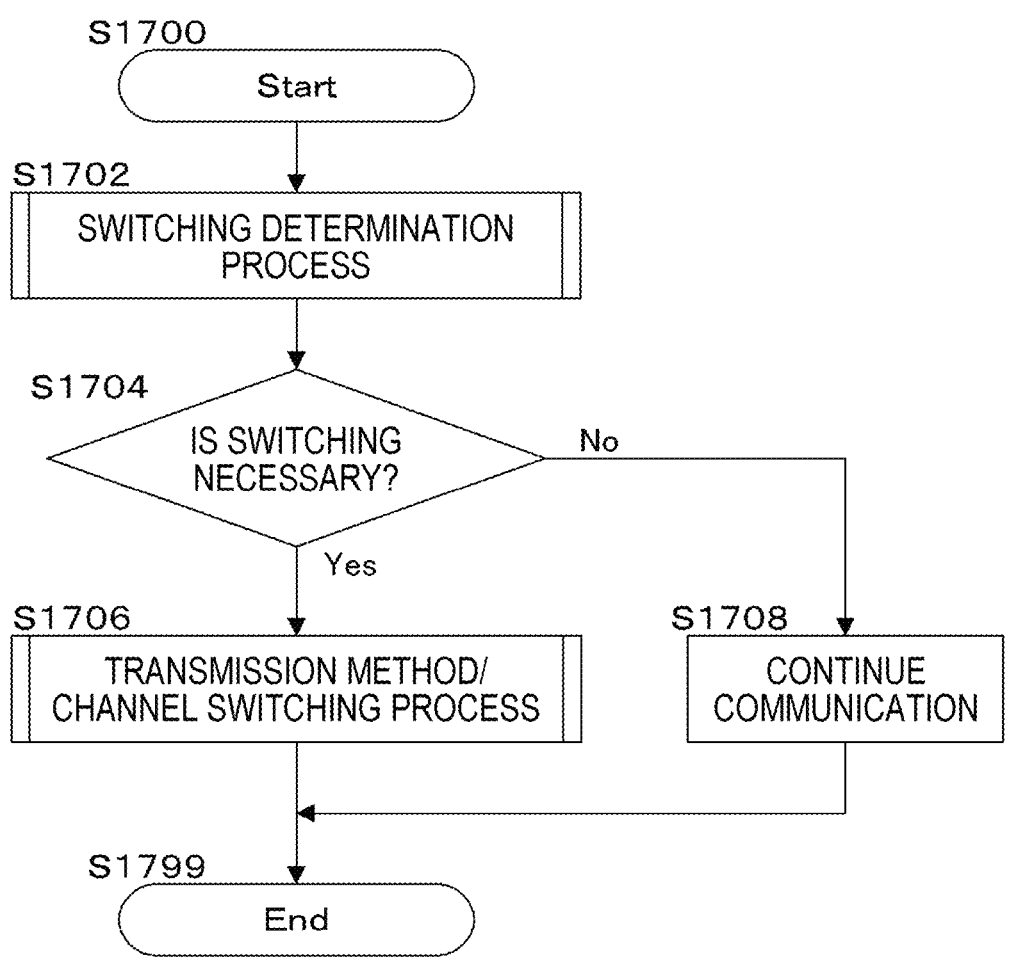
FIG. 17 is a flowchart illustrating an exemplary process according to the third exemplary embodiment.

FIG. 17 is a flowchart illustrating an exemplary process according to the third exemplary embodiment.

In step S1702, the switching determination module 1620 performs a switching determination process. The detailed process of step S1702 will be described later using a flowchart illustrated in an example of FIG. 18 or FIG. 20.

In step S1704, it is determined whether the result of the process of step S1702 indicates a switching is necessary. If it is determined that a switching is necessary, the process proceeds to step S1706. Otherwise, the process proceeds to step S1708.

In step S1706, the transmission method/channel switching module 1625 performs a transmission method/channel switching process. The detailed process of step S1706 will be described later using a flowchart illustrated in an example of FIG. 19.

In step S1708, the wireless communication module 135 continues the communication by the current transmission method and the current channel.

Figure 18:
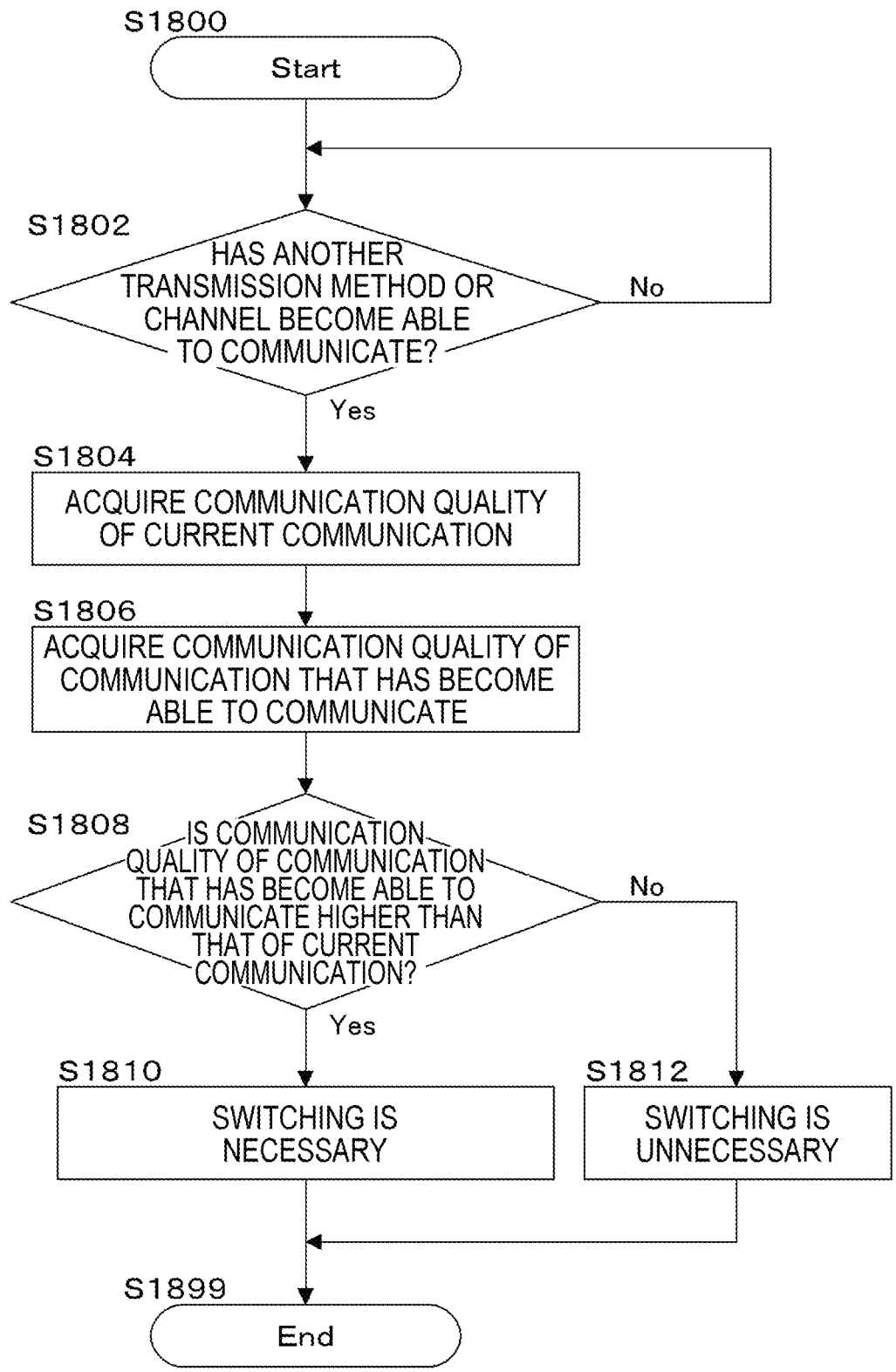
FIG. 18 is a flowchart illustrating an exemplary process according to the third exemplary embodiment.

FIG. 18 is the flowchart illustrating an exemplary process according to the third exemplary embodiment (switching determination module 1620).

In S1802, it is determined whether another transmission method or channel has become able to communicate. If it is determined that another transmission method or channel has become able to communicate, the process proceeds to step S1804. Otherwise, the process stands by until another transmission method or channel becomes able to communicate. In step S1908 of the flowchart illustrated in the example of FIG. 19, a communication is started by the "other transmission method or channel" which has become able to communicate in step S1802.

In step S1804, the communication quality of the current communication is acquired.

In step S1806, the communication quality of the communication that has become able to communicate (the communication using the "other transmission method or channel")

is acquired. As described above, if the communication by the "other transmission method or channel" has been conducted until that time, the communication quality in the communication performance may be acquired. If a communication itself could not be conducted, a nominal value in the communication by the "other transmission method or channel" may be acquired as the communication quality.

In step S1808, it is determined whether the communication quality of the communication that has become able to communicate is higher than the communication quality of the current communication. If the determination is Yes, the process proceeds to step S1810. Otherwise, the process proceeds to step S1812.

In step S1810, it is determined that a switching is necessary.

In step S1812, it is determined that a switching is not necessary.

Figure 19:
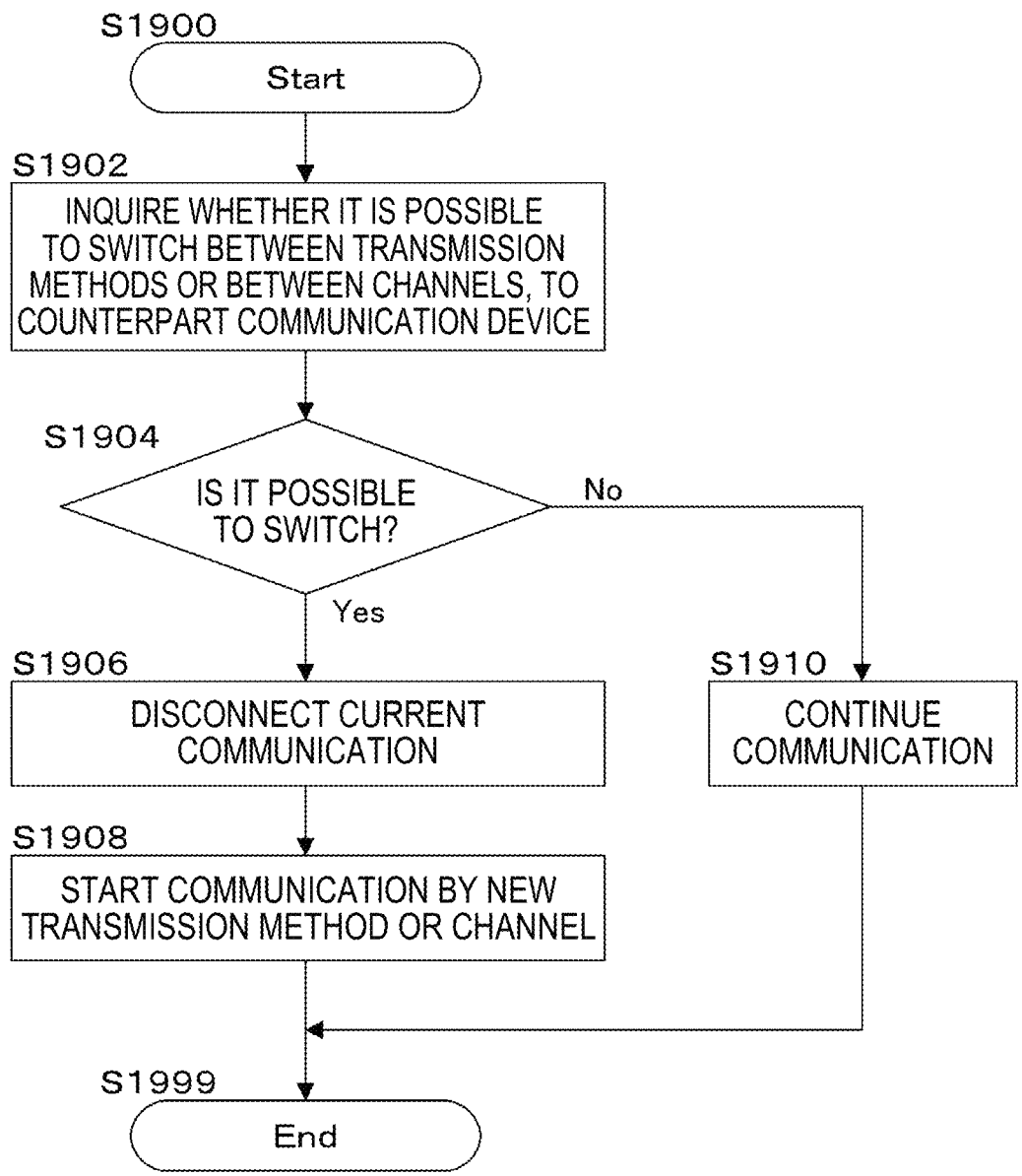
FIG. 19 is a flowchart illustrating an exemplary process according to the third exemplary embodiment.

FIG. 19 is the flowchart illustrating an exemplary process according to the third exemplary embodiment (transmission method/channel switching module 1625).

In step S1902, it is inquired whether it is possible to switch between the transmission methods or between the channels, to the communication device 180 which is a communication counterpart device.

In step S1904, it is determined whether a reply from the communication device 180 indicates that it is possible to switch between the transmission methods or between the channels. If it is determined that the reply indicates that it is possible to switch between the transmission methods or between the channels, the process proceeds to step S1906. Otherwise, the process proceeds to step S1910.

In step S1906, the current communication is disconnected.

In step S1908, a communication is started by the new transmission method or channel. For example, a communication may be started from the beginning by the new transmission method or channel, or the remaining communication may be conducted by the new transmission method or channel.

In step S1910, the wireless communication module 135 continues the current communication.

Figure 20:
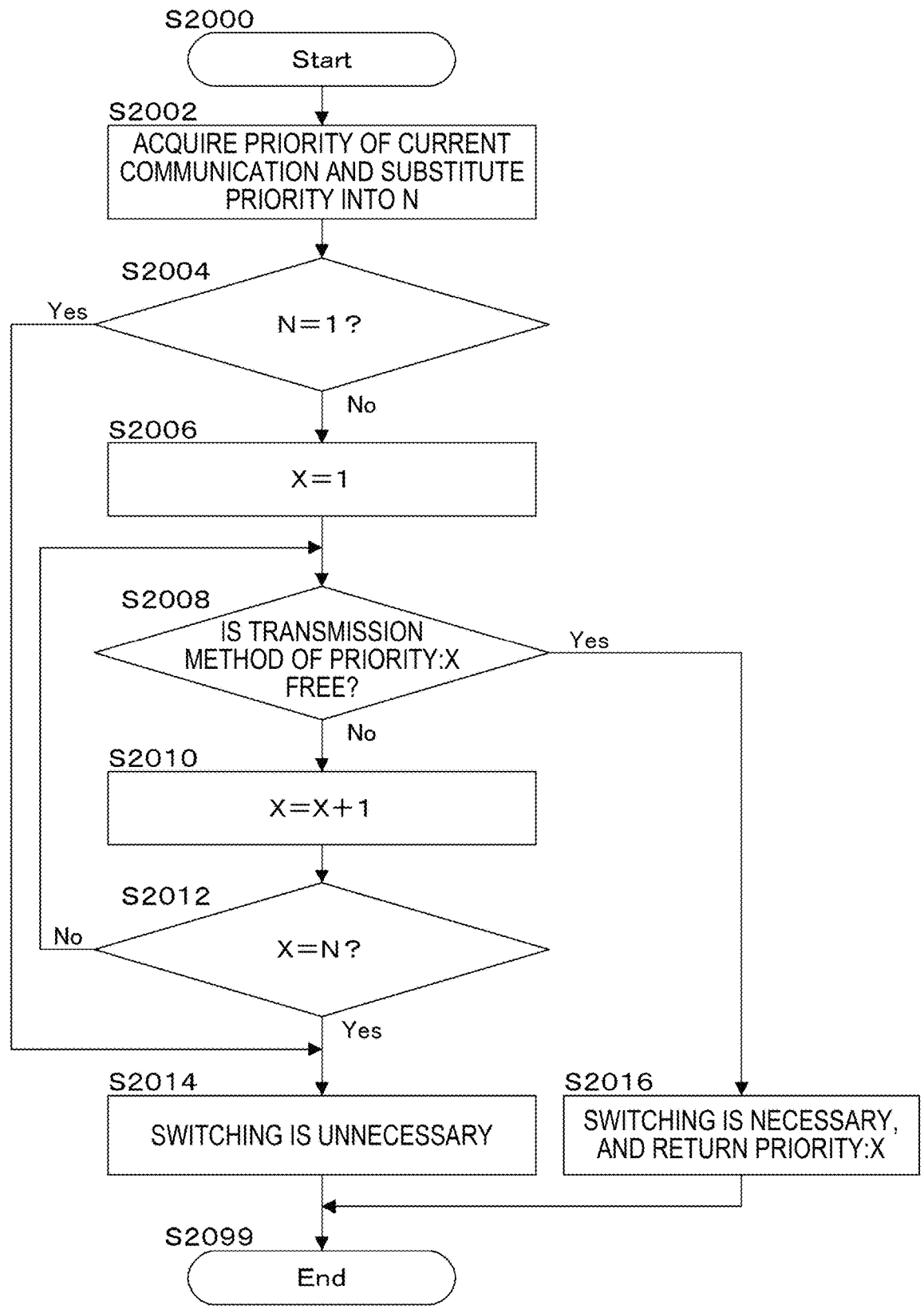
FIG. 20 is a flowchart illustrating an exemplary process according to the third exemplary embodiment.

FIG. 20 is the flowchart illustrating an exemplary process according to the third exemplary embodiment (switching determination module 1620).

In step S2002, a priority of the current communication is acquired, and the acquired value is substituted into a variable N.

In step S2004, it is determined whether N=1 (the variable N is 1). If it is determined that N=1, the process proceeds to step S2014. Otherwise, the process proceeds to step S2006.

In step S2006, it is assumed that X=1 (1 is substituted into the variable X).

In step S2008, it is determined whether the transmission method having the priority: X is free (able to communicate). If it is determined that the transmission method is free, the process proceeds to step S2016. Otherwise, the process proceeds to step S2010. Here, the "transmission method having the priority: X" is extracted using a priority table 2100 or 2200.

FIG. 21 is an explanatory view illustrating an exemplary data structure of the priority table 2100. The priority table 2100 has a priority column 2110 and a transmission method column 2120. The priority column 2110 stores priorities. The transmission method column 2120 stores transmission methods corresponding to the respective priorities. In this example, priorities are assigned in an order of transmission speeds from the highest speed.

FIG. 22 is an explanatory view illustrating an exemplary data structure of the priority table 2200. The priority table 2200 has a priority column 2210, a transmission method column 2220, and a channel column 2230. The priority column 2210 stores priorities. The transmission method column 2220 stores transmission methods corresponding to the respective priorities. The channel column 2230 stores channels corresponding to the respective priorities. The priority table 2200 allows to select, for example, a combination of a transmission method and a channel which have not only a relatively fast communication speed but also the relatively small number of communication errors. The number of communication errors may be calculated from past communication records. In addition, the priority table 2200 may include the combinations of the transmission methods and the channels that have been ranked by the process of the flowchart illustrated in the example of FIG. 15.

In step S2010, it is assumed that X=X+1 (the variable X is incremented).

In step S2012, it is determined whether X=N (values of the variables X and N are equal to each other). If it is determined that X=N (if all transmission methods having higher priorities than that of the current communication are investigated), the process proceeds to step S2014. Otherwise, the process returns to step S2008.

In step S2014, it is determined that a switching is not necessary.

In step S2016, it is replied that a switching is necessary, and the priority: X. In step S1908 of the flowchart illustrated in the example of FIG. 19, a communication is started by the transmission method and channel having the priority X.

Figure 23:
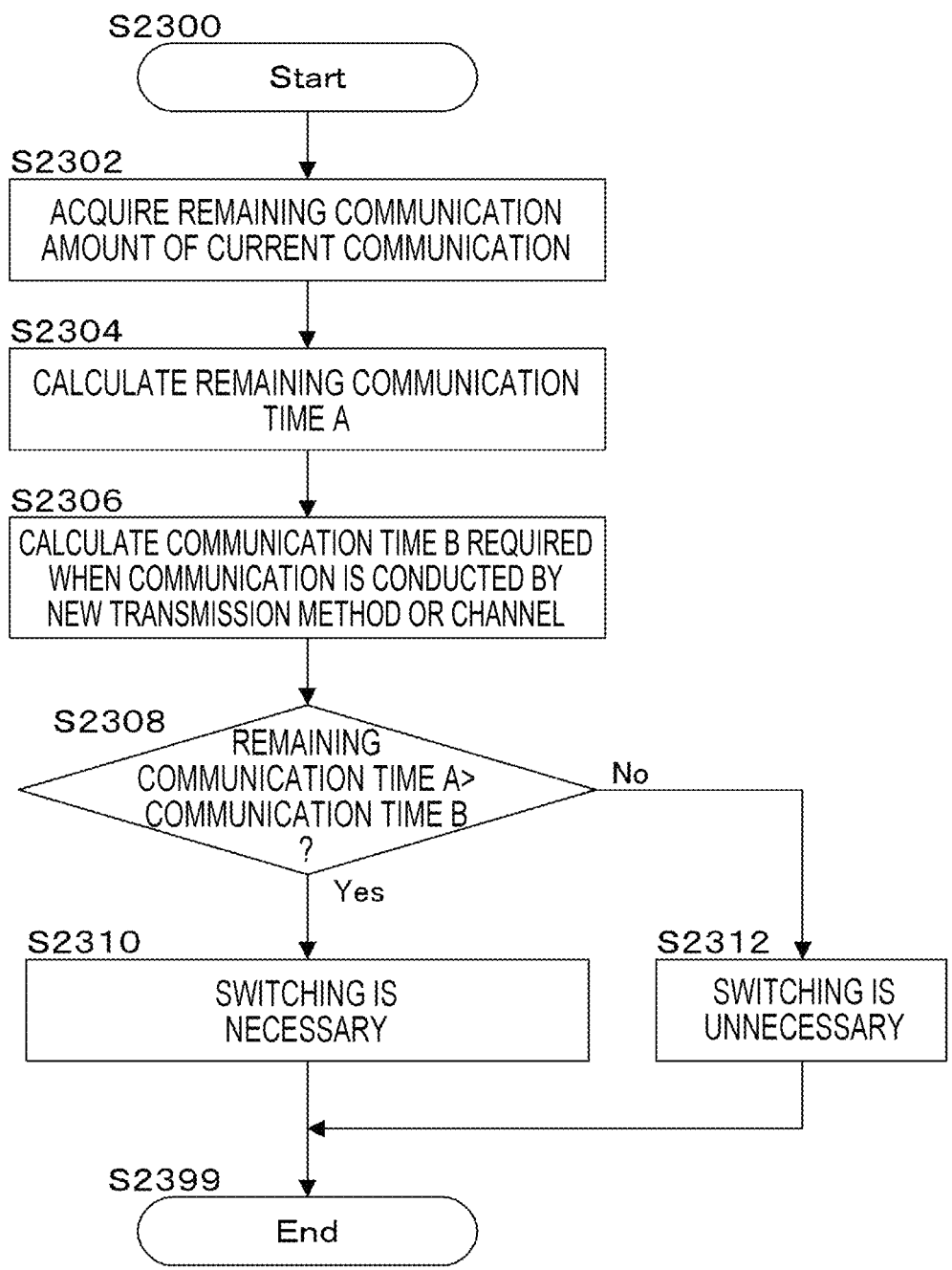
FIG. 23 is a flowchart illustrating an exemplary process according to the third exemplary embodiment.

FIG. 23 is a flowchart illustrating an exemplary process according to the third exemplary embodiment (switching determination module 1620).

Instead of step S1810 of the flowchart illustrated in the example of FIG. 18, the process according to the flowchart illustrated in the example of FIG. 23 may be performed.

In addition, instead of performing step S2016 of the flowchart illustrated in the example of FIG. 20, the process according to the flowchart illustrated in the example of FIG. 23 may be performed. However, in step S2310, "a switching is necessary, and the priority: X is returned."

In step S2302, a remaining communication amount of the current communication is acquired.

In step S2304, a remaining communication time A is calculated using the remaining communication amount and the communication speed (a nominal value or a performance value) of the transmission method or channel.

In step S2306, a communication time B which is required when where communication is conducted by the new transmission method or channel is calculated. For example, if the communication is conducted again from the beginning by the new transmission method or channel, the communication time B is calculated using the communication capacity and the communication speed (a nominal value or a performance value) of the new transmission method or channel. If the remaining communication is conducted by the new transmission method or channel, the communication time B is calculated using the remaining communication amount and the communication speed (a nominal value or a performance value) of the new transmission method or channel.

In step S2308, it is determined whether "remaining communication time A>communication time B." If it is determined that "remaining communication time A>communication time B" (if the communication is completed relatively fast when the communication is switched to the new transmission method or channel), the process proceeds to step S2310. Otherwise, the process proceeds to step S2312.

In step S2310, it is determined that a switching is necessary.

In step S2312, it is determined that a switching is not necessary.

Figure 24:
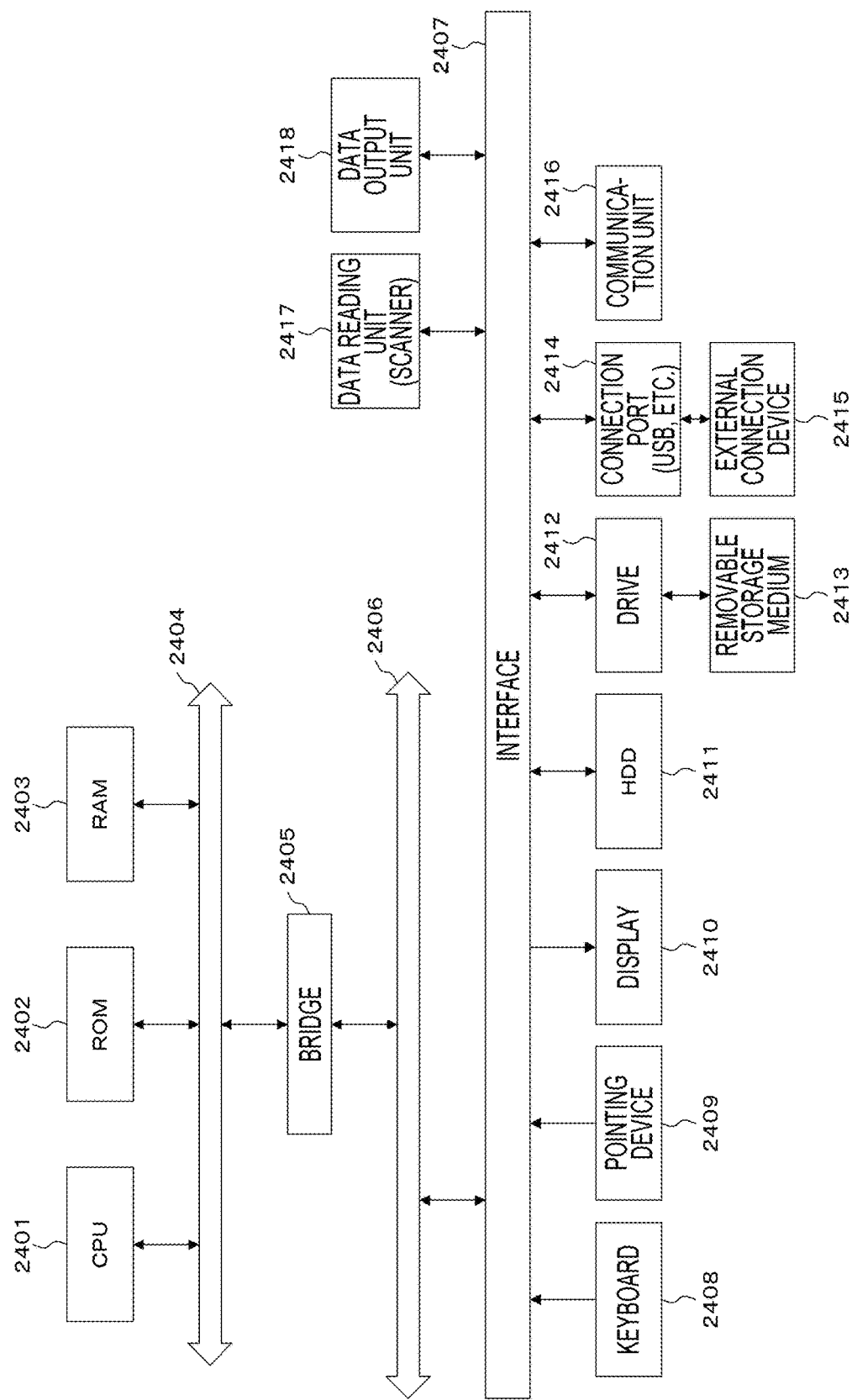
FIG. 24 is a block diagram illustrating an exemplary hardware configuration of a computer implementing the present exemplary embodiment.

An exemplary hardware configuration of the information processing apparatus of the present exemplary embodiment will be described with reference to FIG. 24. The configuration illustrated in FIG. 24 is configured with, for example, a personal computer (PC), and represents an exemplary hardware configuration provided with a data reading unit 2417 such as a scanner and a data output unit 2418 such as a printer. In addition, while the example illustrated in FIG. 3 represents the configuration mainly serving as a chip using the ASIC or the like, the example illustrated in FIG. 24 mainly represents a functional configuration that is implemented with a personal computer or the like. For example, a CPU 2401 takes in charge of the functions of the SoC 300 and the ASIC 330.

The CPU 2401 is a controller that performs processes according to a computer program describing an execution sequence of each of the various modules described in the above-described exemplary embodiment, that is, the communication control module 110, the communication quality acquisition module 115, the switching determination module 120, the channel switching module 125, the transmission method switching module 130, the wireless communication module 135, the communication control module 1110, the transmission method switching module 1125, the channel switching module 1130, the communication control module 1610, the switching determination module 1620, the transmission method/channel switching module 1625 and others.

A read only memory (ROM) 2402 stores programs, operation parameters and others used by the CPU 2401. A RAM 2403 stores programs used in the execution by the CPU 2401, parameters appropriately varying in the execution and others. These components are connected to each other by a host bus 2404 configured with a CPU bus or the like.

The host bus 2404 is connected to an external bus 2406 such as a peripheral component interconnect/interface (PCI) bus via a bridge 2405.

A keyboard 2408 and a pointing device 2409 such as a mouse are devices operated by an operator. A display 2410 is, for example, a liquid crystal display device or a cathode ray tube (CRT), and displays various types of information as texts and image information. In addition, a touch screen or the like having the functions of both the pointing device 2409 and the display 2410 may be used. In this case, the function of the keyboard may be implemented by drawing the keyboard using software (also called a so-called software keyboard, screen keyboard or the like) on the screen (the touch screen), without the physical connection as in the keyboard 2408.

A hard disk drive (HDD) 2411 is equipped with a hard disk (which may be a flash memory or the like) therein, drives the hard disk, and stores or plays programs or information executed by the CPU 2401. The hard disk stores channel use tables 700 and 800, a transmission method use table 1000, the priority tables 2100 and 2200, communication contents and others. Further, in the hard disk, other various data and various computer programs are stored.

A drive 2412 reads data or programs stored in a removable storage medium 2413 such as a mounted magnetic disk, an optical disc, a magneto-optical disc, or a semiconductor memory, and supplies the data or programs to the interface 2407, the external bus 2406, the bridge 2405, and the RAM 2403 connected via the host bus 2404. In addition, the removable storage medium 2413 may also be used as a data storing area.

A connection port 2414 is a port for connection of an external connection device 2415, and includes connection units such as USB and IEEE 1394. The connection port 2414 is connected to the CPU 2401 and others via the interface 2407, the external bus 2406, the bridge 2405, the host bus 2404 and others. A communication unit 2416 is connected to a communication line and performs a process of a data communication with an external device. The data reading unit 2417 is, for example, a scanner and performs a document reading process. The data output unit 2418 is, for example, a printer and performs a document data outputting process.

The hardware configuration of the information processing apparatus illustrated in FIG. 24 represents an exemplary configuration. The present exemplary embodiment is not limited to the configuration illustrated in FIG. 24, and may be any configuration that may execute the modules described in the present exemplary embodiment. For example, some of the modules may be configured with dedicated hardware (for example, application specific integrated circuit (ASIC)), and some of the modules may be in the form in which the modules are present in an external system and connected via a communication line. Further, the multiple systems illustrated in FIG. 24 may be connected to each other via a communication line and cooperate with each other. In addition, especially, the multiple systems of FIG. 12 may be incorporated in a personal computer, a portable information communication device (including a mobile phone, a smart phone, a mobile device, a wearable computer, and the like), an information appliance, a robot, a copying machine, a facsimile, a scanner, a printer, a multi-functional machine (an image processing apparatus having two or more functions of a scanner, a printer, a copying machine, a facsimile and, the like), and the like.

In the comparing process described in the above-described exemplary embodiment, the expressions "equal to or more than," "equal to or less than," "larger than," and "smaller than (not exceeding)" may be replaced with "larger than," "smaller than (not exceeding)," "equal to or more than," and "equal to or less than," respectively unless the replacement causes contradiction.

In addition, if the communication quality is not improved even by changing a transmission method, the channel may be switched to another channel. Here, specifically, the case where the "communication quality is not improved" corresponds to (i) a case where a difference between values of the communication quality before and after the transmission method switching is within a predetermined value or (ii) a case where the communication quality after switching between the transmission methods is worse than that before switching between the transmission methods.

The above-described programs may be provided in the form of being stored in a storage medium or provided by a communication unit. In this case, for example, the above-described programs may be construed as an invention of a "computer readable storage medium storing a program."

The "computer readable storage medium storing a program" refers to a computer readable storage medium storing a program, which is used for installation, execution, distribution, and the like of a program.

The storage medium includes, for example, a digital versatile disc (DVD) such as "DVD-R, DVD-RW, DVD-RAM or the like" which is the standard formulated in the DVD forum, "DVD+R, DVD+RW or the like" which is the standard formulated in DVD+RW, a compact disc (CD) such as a CD read only memory (CD-ROM), a CD recordable (CD-R), or a CD rewritable (CD-RW), a Blu-ray disc (Blu-ray (registered trademark) disc), a magneto-optical (MO) disc, a flexible disk (FD), a magnetic tape, a hard disk, a ROM, an electrically erasable and rewritable read only memory (EEPROM (registered trademark)), a flash memory, a random access memory (RAM), and a secure digital (SD) memory card.

All or some of the above-described programs may be stored in the storage medium so as to be saved or distributed. Further, the programs may be transmitted using a transmission medium such as a wired network used in a local area network (LAN), a metropolitan area network (MAN), a wide area network (WAN), the Internet, the Intranet, the Extranet, and the like, a wireless communication network, or a combination thereof, or may be carried on carrier waves.

In addition, the above-described programs may be all or parts of other programs, or may be stored together with separate programs in the storage medium. In addition, the above-described programs may be divided and stored in multiple storage media. In addition, the above-described programs may be stored in a compressed or encrypted form as long as the programs may be restored.

The above-described exemplary embodiments (especially, the first and second exemplary embodiments) may be understood as described below. In addition, these exemplary embodiments may be combined with the third exemplary embodiment.

[A1] An information processing apparatus including:
a communication unit configured to conduct a wireless communication using plural transmission methods, at least one of which has plural channels;
a first switching unit configured to switch between the channels according to a quality of a communication that is being conducted; and
a second switching unit configured to switch between the transmission methods when the first switching unit could not switch between the channels.

[A2] The information processing apparatus according to [A1], wherein if the number of times of the switching by the first switching unit is larger than or equal to or larger than a predetermined value, the second switching unit performs the switching.

[A3] The information processing apparatus according to [A1], wherein if the first switching unit could not select a channel different from an already selected channel, the second switching unit performs the switching.

[A4] The information processing apparatus according to [A3], wherein if the first switching unit could not select a channel of a frequency band that does not overlap with the already selected channel, the second switching unit performs the switching.

[A5] The information processing apparatus according to [A1], wherein the transmission methods include at least IEEE802.11ad.

[A6] The information processing apparatus according to [A5], wherein the second switching unit switches a transmission method to IEEE802.11ad.

[A7] A non-transitory computer readable storage medium storing an information processing program that, when executed, causes a computer to function as:
a communication unit configured to conduct a wireless communication using plural transmission methods, one of which has plural channels;
a first switching unit configured to switch between the channels according to quality of a communication that is being conducted; and
a second switching unit configured to switch between the transmission methods when the first switching unit could not switch between the channels.

The above-described modified exemplary embodiments may have the following effects.

With the information processing apparatus of [A1], when switching between channels or switching between transmission methods is performed according to a communication quality of a communication that is being conducted, a channel may be preferentially switched.

With the information processing apparatus of [A2], when the number of times of switching between the channels is more than or equal to or more than a predetermined value, switching between transmission methods may be performed.

With the information processing apparatus of [A3], an endless loop of channel selection may be prevented.

With the information processing apparatus of [A4], selection of a channel which is likely to cause an interference may be prevented.

With the information processing apparatus of [A5], IEEE802.11ad may be included as a transmission method.

With the information processing apparatus of [A6], a transmission method may be switched to IEEE802.11ad.

With the information processing apparatus of [A7], when switching between channels or switching between transmission methods is performed according to a communication quality of a communication that is being conducted, switching between may be preferentially performed.

In addition, the above-described exemplary embodiments may be understood as follows.

[B1] An information processing apparatus including:
a communication unit configured to conduct a wireless communication using plural transmission methods, each of the transmission methods having plural channels;
a first switching unit configured to switch between the transmission methods according to quality of a communication that is being conducted; and
a second switching unit configured to switch between the channels when the first switching unit could not switch between the transmission methods.

[B2] The information processing apparatus according to [B1], wherein if the number of times of the switching by the first switching unit is larger than or equal to or larger than a predetermined value, the second switching unit performs the switching.

[B3] The information processing apparatus according to [B1], wherein if the first switching unit could not select a transmission method different from an already selected transmission method, the second switching unit performs the switching.

[B4] The information processing apparatus according to [B1], wherein the transmission methods include at least IEEE802.11ad.

[B5] The information processing apparatus according to [B4], wherein the first switching unit switches a transmission method to IEEE802.11ad.

[B6] The information processing apparatus according to [B1], wherein the first switching unit switches a transmission method to a predetermined transmission method and a predetermined channel.

[B7] The information processing apparatus according to [B6], further including:

a determination unit configured to determine the predetermined transmission method and the predetermined channel at a time when the information processing apparatus is installed.

[B8] A non-transitory computer readable storage medium storing an information processing program that, when executed, causes a computer to function as:

a communication unit configured to conducting a wireless communication using plural transmission methods, each of the transmission methods having plural channels;

a first switching unit configured to switch between the transmission methods according to quality of a communication that is being conducted; and a second switching unit configured to switch between the channels when the first switching unit could not switch between the transmission methods.

The above-described modified exemplary embodiments may have the following effects.

With the information processing apparatus of [B1], when a channel or transmission method is switched according to a communication quality of a communication that is being conducted, switching between the transmission methods may be preferentially performed.

With the information processing apparatus of [B2], when the number of times of switching between the transmission methods is more than or equal to or more than a predetermined value, switching between the channels may be performed.

With the information processing apparatus of [B3], an endless loop of transmission method selection may be prevented.

With the information processing apparatus of [B4], IEEE802.11ad may be included as a transmission method.

With the information processing apparatus of [B5], a transmission method may be switched to LEEE802.11ad.

With the information processing apparatus of [B6], a transmission method may be switched to a predetermined transmission method and channel.

With the information processing apparatus of [B7], a transmission method and a channel may be selected when the information processing apparatus is installed.

With the non-transitory computer readable storage medium of [B8], when switching between channels or switching between transmission methods is performed according to a communication quality of a communication that is being conducted, switching between the transmission methods may be preferentially performed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable storage medium storing an information processing program that, when executed, causes an information processing apparatus to:
control an array comprising an antenna and communication chips, the array being configured to conduct wireless communication using a plurality of transmission methods, one of which has a plurality of channels;
communicate with a mobile device;
determine whether a channel having a higher communication quality than that of the communication that is being conducted with mobile device is available to be used to communicate;
control the array to switch to the channel having the higher communication quality for communication with the mobile device, if the channel is available; and
control the array to switch to a different transmission method among the plurality of transmission methods for communication with mobile device, the different transmission method being IEEE 802.11ad, if the channel is not available,
wherein the information processing apparatus is a printer.

2. An information processing apparatus comprising:
an array comprising an antenna and communication chips, the array being configured to conduct wireless communication using a plurality of transmission methods, one of which has a plurality of channels; and
a processor programmed to:
communicate with a mobile device,
determine whether a channel having a higher communication quality than that of the communication that is being conducted with the mobile device is available to be used to communicate,
control the array to switch to the channel having the higher communication quality for communication with the mobile device, if the channel is available, and
control the array to switch to a different transmission method among the plurality of transmission methods for communication with the mobile device, the different transmission method being IEEE 802.11ad, if the channel is not available,
wherein the information processing apparatus is a printer.

3. The information processing apparatus according to claim 2, wherein the processor is programmed to control the array to switch to the channel having the higher communication quality or switch to the different transmission method, according to a remaining communication amount.

* * * * *